(12) United States Patent
Masaki et al.

(10) Patent No.: US 6,515,949 B2
(45) Date of Patent: Feb. 4, 2003

(54) STORAGE APPARATUS

(75) Inventors: Takashi Masaki; Shigenori Yanagi, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/727,721

(22) Filed: Dec. 1, 2000

(65) Prior Publication Data

US 2001/0043536 A1 Nov. 22, 2001

(30) Foreign Application Priority Data

May 19, 2000 (JP) .......................................... 12-147431

(51) Int. Cl.[7] ................................................ G11B 7/00
(52) U.S. Cl. ................ 369/53.11; 369/47.1; 369/47.53; 369/53.29; 369/116
(58) Field of Search .............................. 369/47.1, 47.11, 369/47.15, 47.39, 53.1, 53.11, 47.53, 53.37, 59.1, 59.11, 59.14, 116, 47.5

(56) References Cited

U.S. PATENT DOCUMENTS

| | | | | |
|---|---|---|---|---|
| 5,862,103 A | * | 1/1999 | Matsumoto et al. .... | 369/116 X |
| 5,920,534 A | * | 7/1999 | Furuta et al. ................ | 369/116 |
| 6,067,284 A | * | 5/2000 | Ikeda et al. .................. | 369/116 |
| 6,275,462 B1 | | 8/2001 | Masaki et al. .............. | 369/116 |

FOREIGN PATENT DOCUMENTS

| | | |
|---|---|---|
| JP | 7-192409 | 7/1995 |
| JP | 8-7381 | 1/1996 |
| JP | 2001-05972 | 4/2000 |

* cited by examiner

*Primary Examiner*—Muhammad Edun
(74) *Attorney, Agent, or Firm*—Greer, Burns & Crain, Ltd.

(57) ABSTRACT

When a migration is predicted and judged of continuous recording and regeneration to an adjacent next optimum condition effective area in the course of data sequential processing for recording or regenerating data continuous in a certain optimum condition effective area, a setting control unit performs optimum condition setting processing (erase, recording, regeneration) of the next optimum condition effective area under the control of an optimum condition setting processing unit, to thereby previously determine the optimum emission power and the optimum magnetic field.

20 Claims, 25 Drawing Sheets

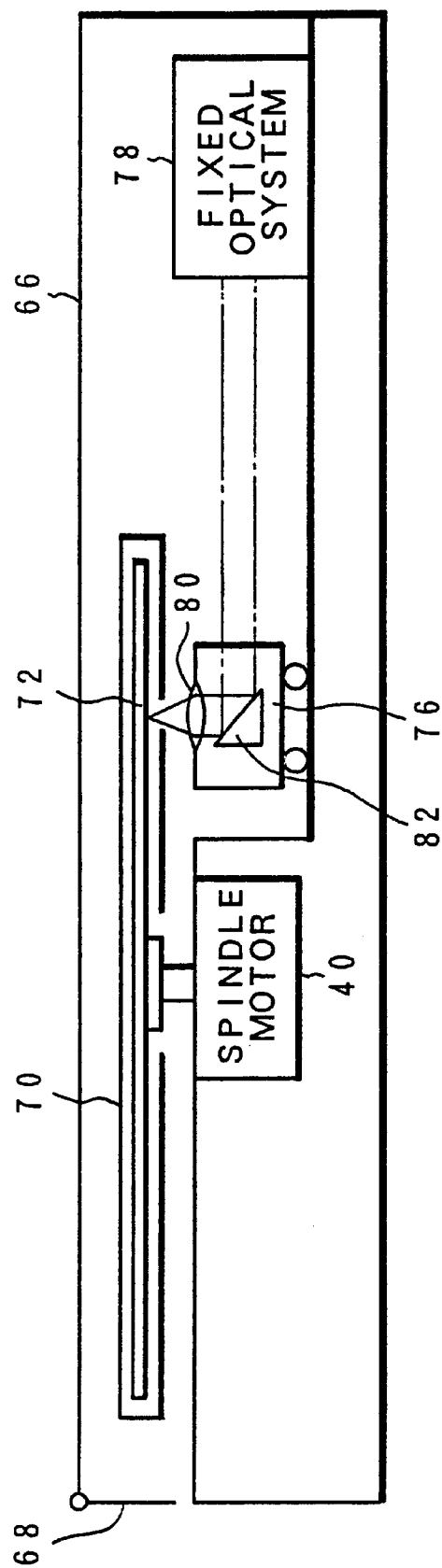

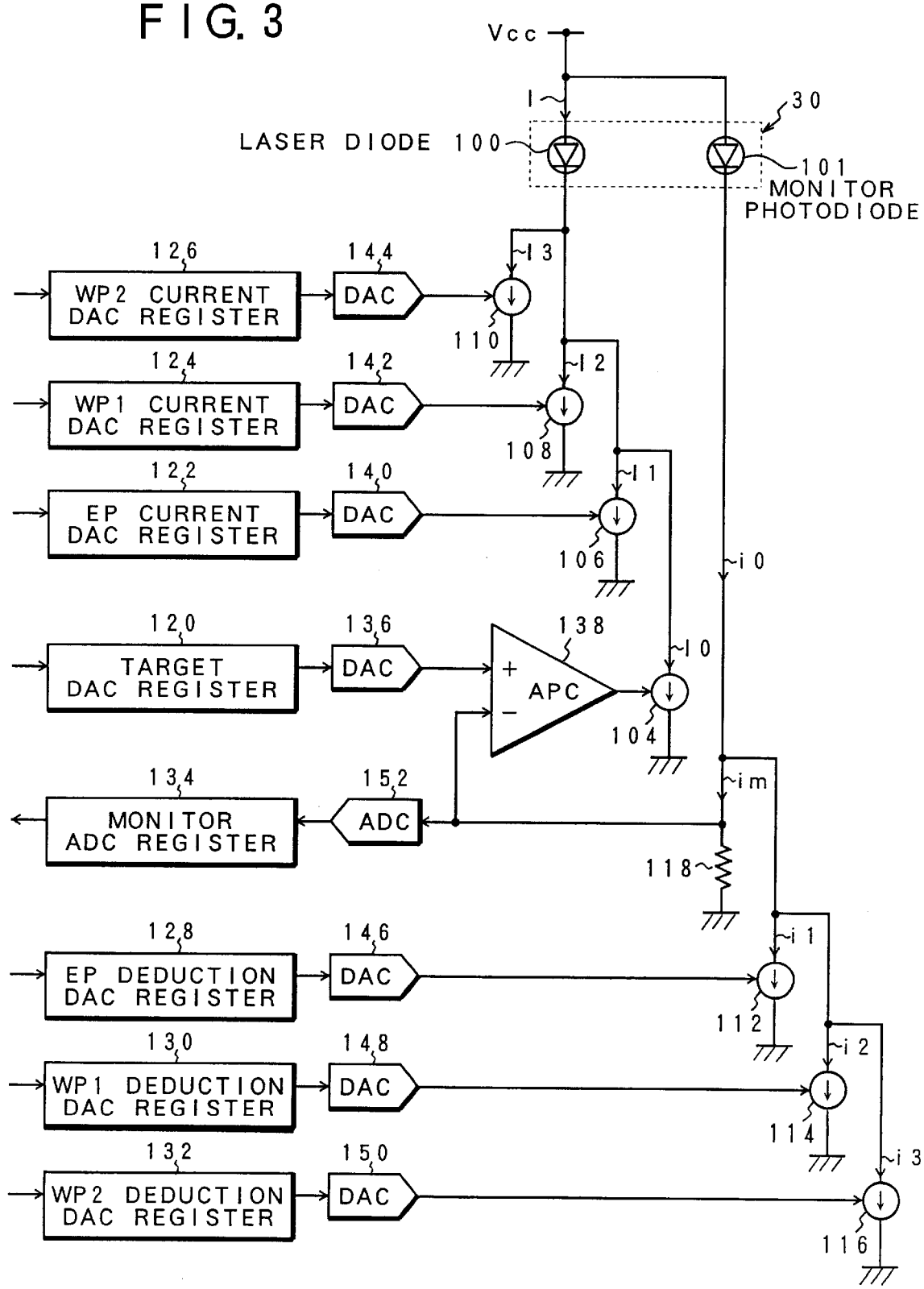

WRITE GATE

WRITE DATA

WRITE CLOCK

PULSE WIDTH DATA

ASSIST PULSE (FOR PA)

FIRST WRITE PULSE (FOR WP1)

SECOND WRITE PULSE (FOR WP2)

EMISSION CURRENT /POWER

DEDUCTION CURRENT

MONITOR CURRENT im
{i0−(i1+i2+i3)}

FIG. 5A WRITE GATE 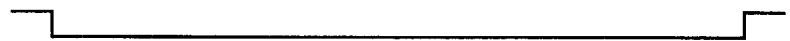
FIG. 5B WRITE DATA 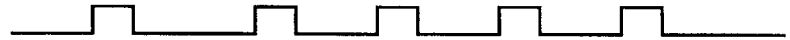
FIG. 5C WRITE CLOCK 
FIG. 5D PULSE WIDTH DATA 
FIG. 5E ASSIST PULSE (FOR PA) 
FIG. 5F FIRST WRITE PULSE (FOR WP1) 
FIG. 5G SECOND WRITE PULSE (FOR WP2) 
FIG. 5H EMISSION CURRENT/POWER 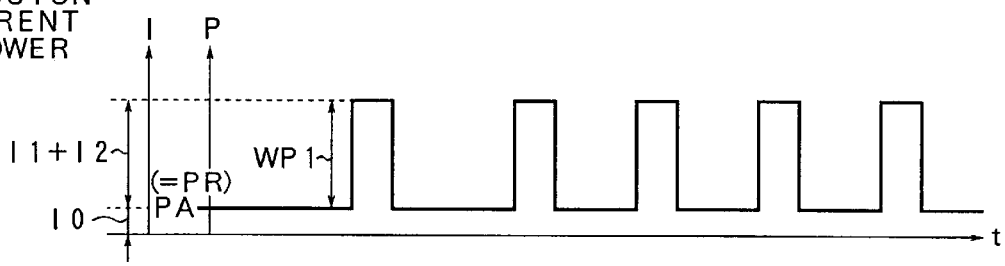
FIG. 5I DEDUCTION CURRENT 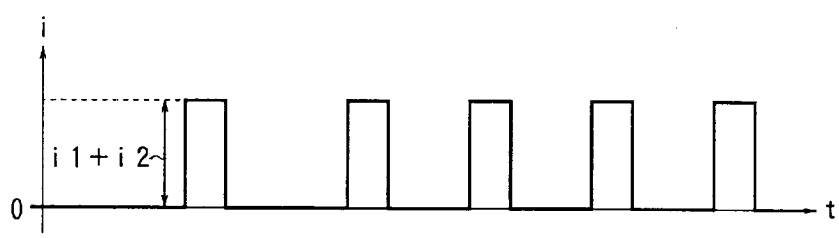
FIG. 5J MONITOR CURRENT im {i0−(i1+i2)} 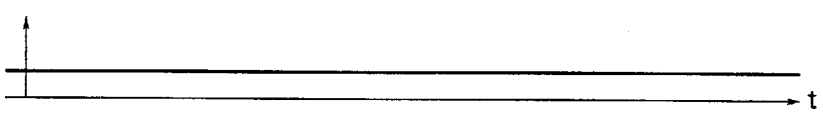

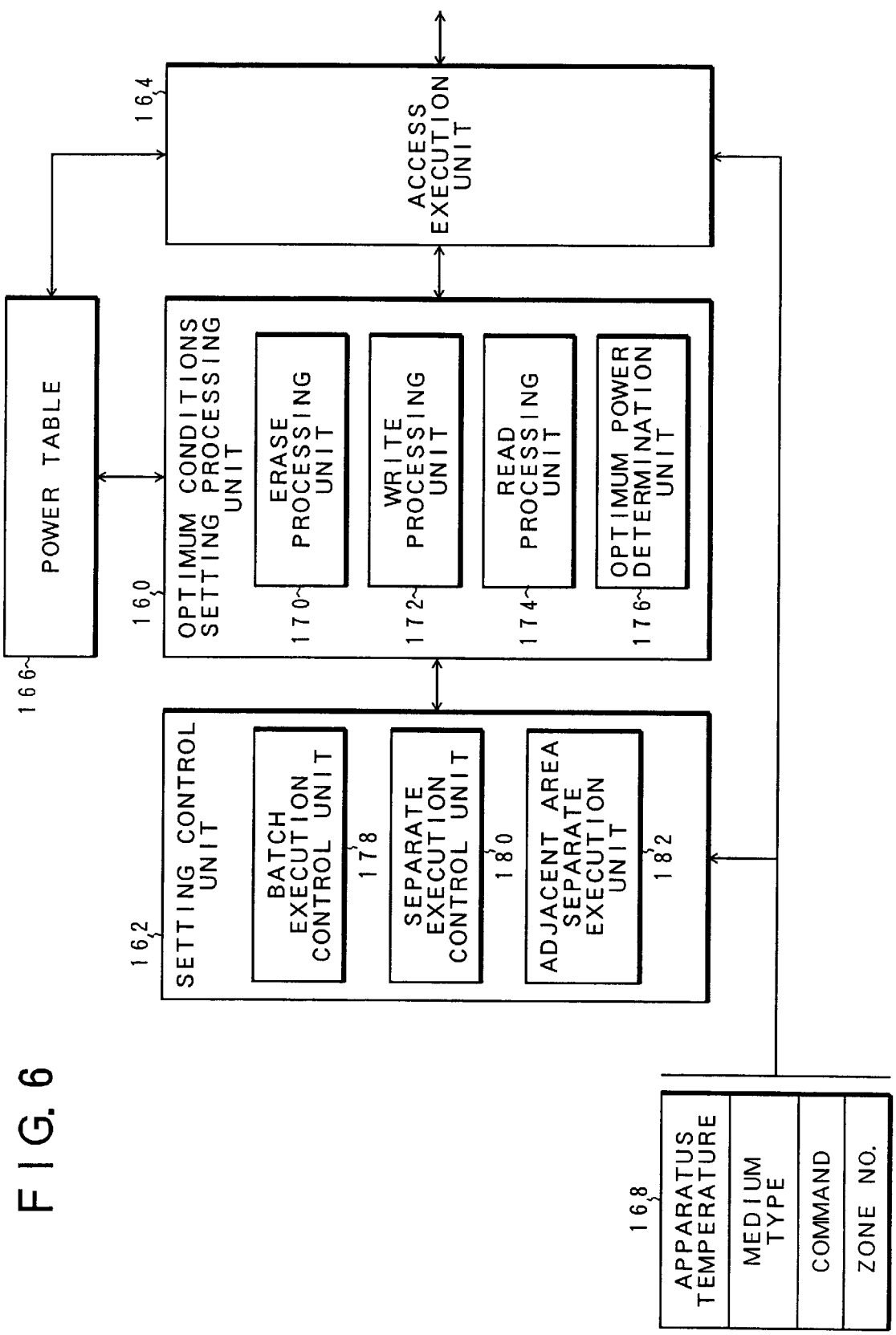
F I G. 6

FIG. 7

| AREA | ZONE | DEFAULT ERASE POWER | DEFAULT WRITE POWER | POWER OFFSET | TRIAL RECORD FLAG |
|---|---|---|---|---|---|
| INNER PERIPHERAL AREA 184 | 1 | DEP1 | DWP1 | POFS1 | FL1 |
| | 2 | DEP2 | DWP2 | | |
| | 3 | DEP3 | DWP3 | | |
| | 4 | DEP4 | DWP4 | | |
| | 5 | DEP5 | DWP5 | | |
| | 6 | DEP6 | DWP6 | | |
| INTERMEDIATE AREA 186 | 7 | DEP7 | DWP7 | POFS2 | FL2 |
| | 8 | DEP8 | DWP8 | | |
| | 9 | DEP9 | DWP9 | | |
| | 10 | DEP10 | DWP10 | | |
| | 11 | DEP11 | DWP11 | | |
| | 12 | DEP12 | DWP12 | | |
| OUTER PERIPHERAL AREA 188 | 13 | DEP13 | DWP13 | POFS3 | FL3 |
| | 14 | DEP14 | DWP14 | | |
| | 15 | DEP15 | DWP15 | | |
| | 16 | DEP16 | DWP16 | | |
| | 17 | DEP17 | DWP17 | | |
| | 18 | DEP18 | DWP18 | | |

166

FIG. 11A
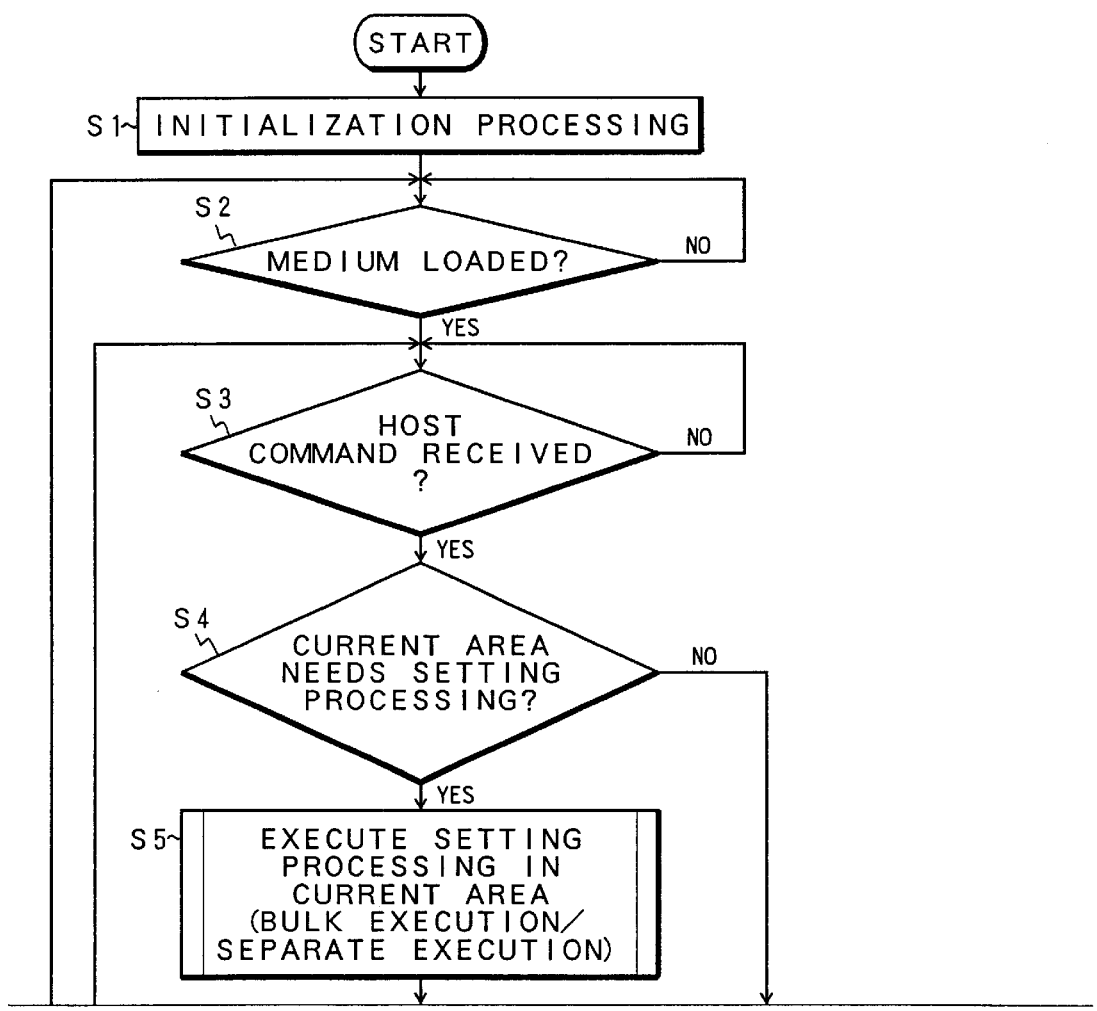

FIG. 11B
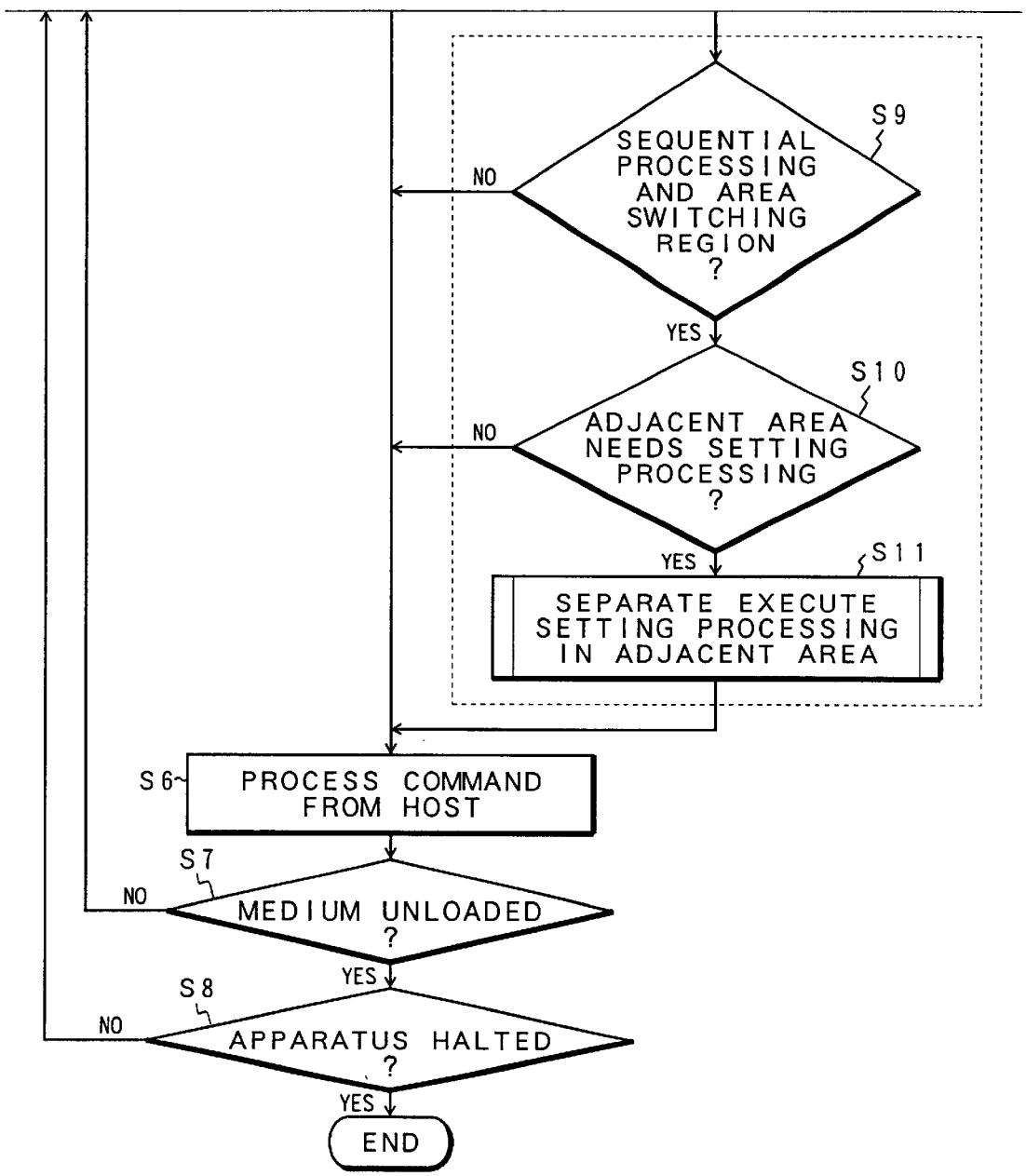

FIG. 13A
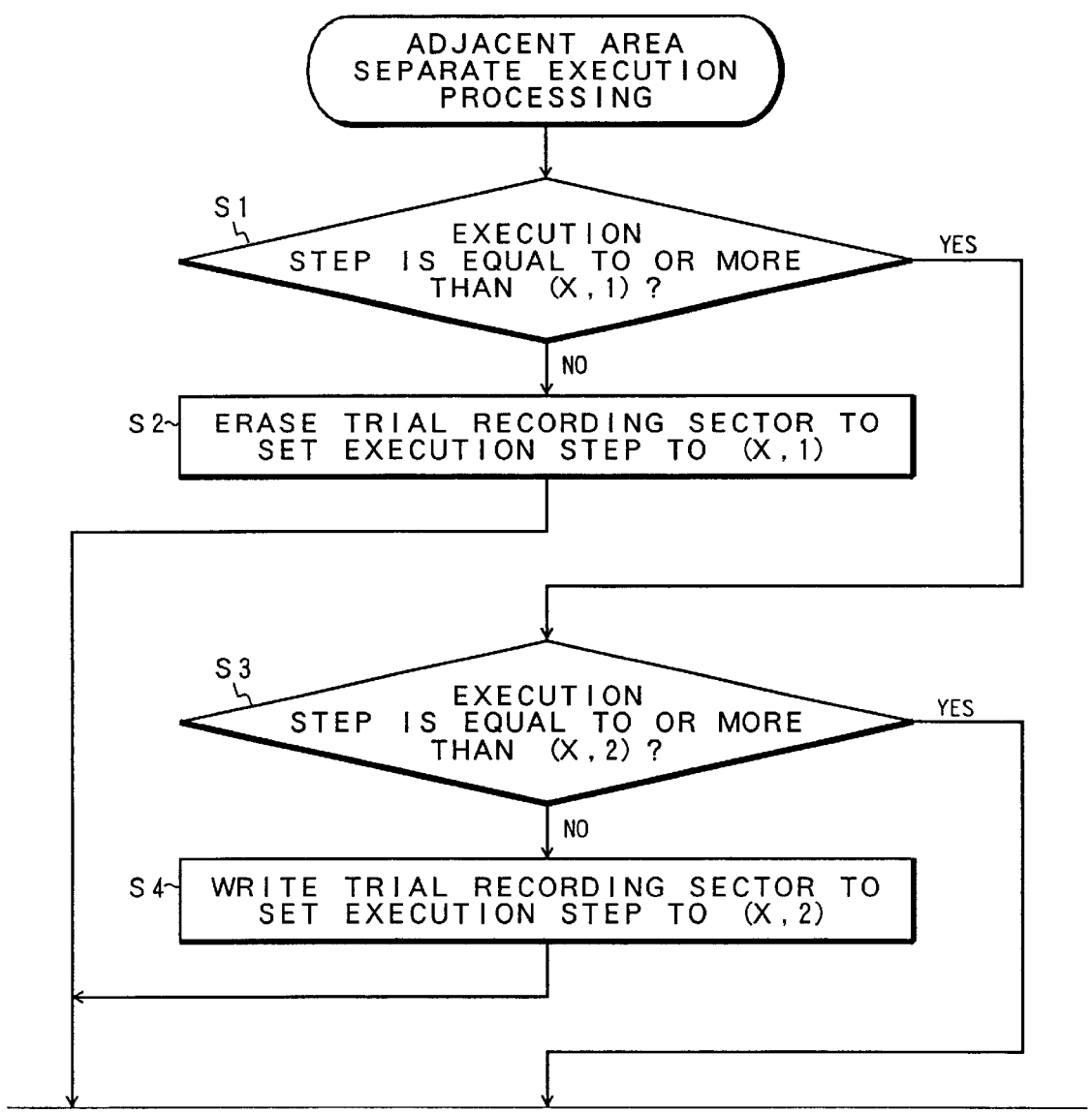

FIG. 14A
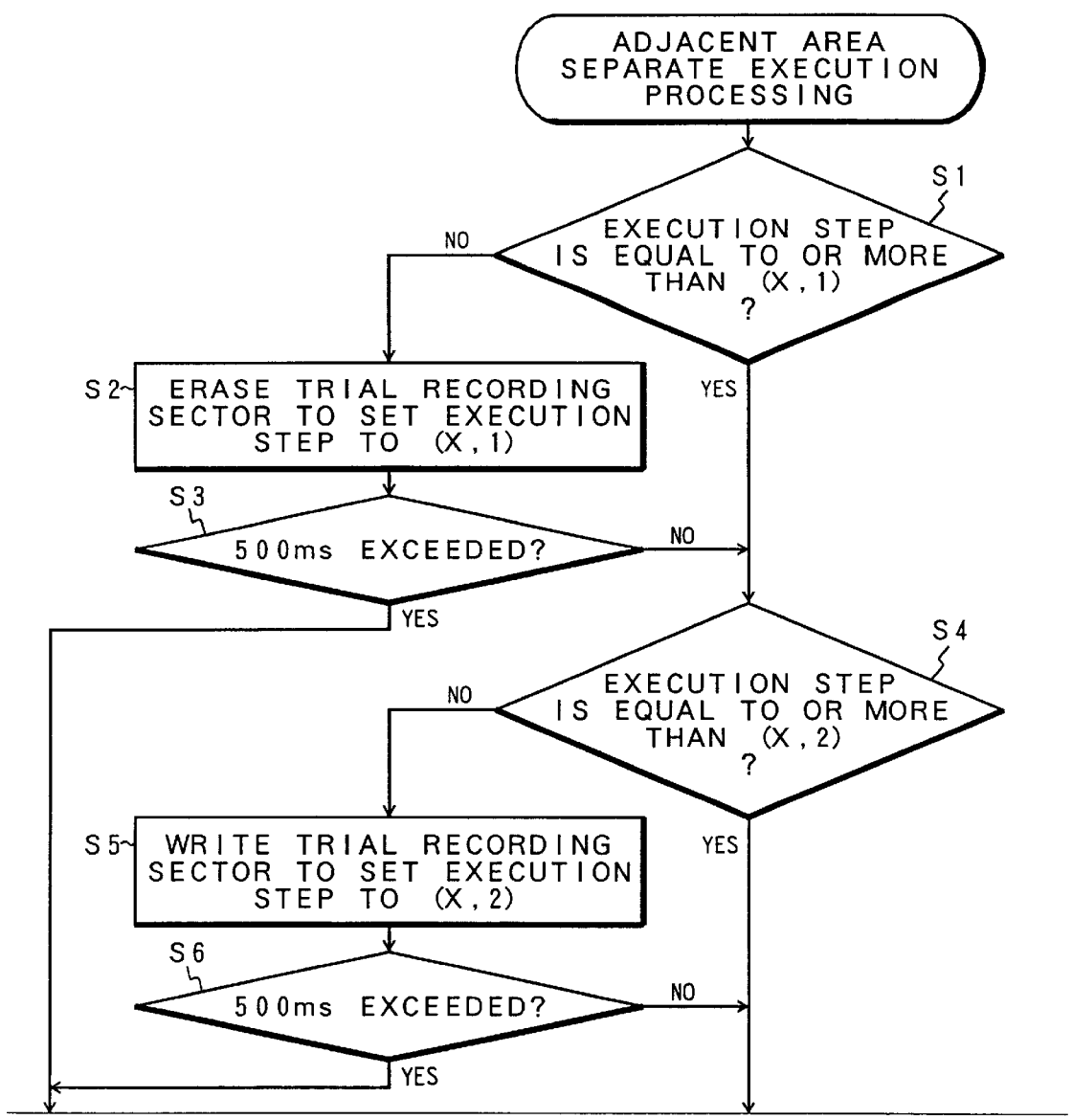

STORAGE APPARATUS

BACKGROUND OF THE INVENTION

1. Field of the Invention

The present invention relates generally to a storage apparatus for optically recording and regenerating information on an optical storage medium by use of a laser light, and more particularly, to a storage apparatus for executing the recording or regeneration while determining the optimum laser power of a laser diode by test recording on the medium upon the reception of a host command.

2. Description of the Related Arts

An optical disk apparatus is widely known as an optical storage that serves as a data storage unit for performing recording and regeneration by use of an optical storage medium and a head. To keep the recording and regeneration performances of the optical disk medium such as a magneto-optical disk in the optical disk apparatus, the optimum laser power of the laser diode needs to be determined. Data recording is typically carried out by a preset write laser power (default write power) proper to the apparatus, depending on radial locations on the data recording optical disk medium and depending on apparatus temperature. With the increased recording density of the optical storage medium, however, it is getting difficult to achieve an optimum recording by the write laser power proper to the apparatus. As a solution to this problem, test recording (test write) is performed to determine the optimum laser power previous to the data recording. In the test recording, previous to the data recording the data are erased and recorded in a test recording region in the vicinity of the data recording region by the default write laser power, after which the error correction function is cancelled for regeneration and the write data and the regeneration data are compared with each other to figure out the error data count of the data. Such test recording is iterated by a prescribed number of times while varying the recording laser power. As a result of this, a point minimizing the read error data count is determined as the optimum laser power for recording. The test recording induces an extended operation time due to the iteration of the erase, recording and regeneration with the varying recording laser power. In the event of incapability of finding the optimum laser power with the variances of the power value by the prescribed number of times in particular, a retry is needed for finding the optimum laser power with a further variance of the recording laser power, which may further take an additional operation time. In this manner, the test recording is time-consuming, during which the write command must be stood by. Too a long standby of the host may result in an impairment of the apparatus recording performances, and even longer standby may possibly cause a timeout error and hence an apparatus recording failure. In order to prevent such a performance degradation arising from the test recording, the inventors of this application have proposed a method in which the test recording is executed in a separate manner (U.S. Pat. No. 6,014,349). In this separate test recording, the test recording executed in response to a command from the host is once interrupted at the elapse of a certain period of time to perform the host command processing and is resumed from the last interrupted sequence at the issuance of the next host command. By the way, the laser power optimum recording conditions vary depending on the radial locations on the optical recording medium, so that the medium is segmented into a plurality test recording effective areas in the radial direction of the medium so as to ensure that the recording within each area can be made under the same conditions. This means that the result of a test recording of a certain area is effective only in the area where the test recording has been made and that for the recording in a different area another test recording for obtaining the optimum recording conditions in the different area must be executed.

In recent years, application of the optical storage apparatus to the multimedia adapted data processing system necessitates the recording and regeneration of sequential data such as acoustic data or animation data. In case of recording the acoustic data, it is preferred to record the acoustic data on the optical disk medium in a sequential manner since the acoustic data or the animation data are typically sequential data. Thus, sequential data recording is made. From their characteristics, the acoustic data or the animation data must be recorded in a sequential manner. Therefore, if the recording processing is interrupted for a long period of time, it may become difficult to process the subsequent data in sequence, resulting in errors. In this manner, it is preferred for the sequential recording of the acoustic data or the animation data to minimize the interruption. In case of using the optical disk apparatus for the acoustic data recording purposes for example, from the feature of the acoustic data recording a method may often be employed in which data are sequentially recorded on a spirally extending track of the optical disk medium. More specifically, sequential recording is effected from the innermost or outermost track and, the instant that recording is complete of the entirety of a certain area where the optimum laser power has been determined, the recording of the next area is started. In cases where a migration occurs to the next area beyond the current area where the test recording result is effective as a result of such sequential data recording, write processing in the next area cannot be performed till that time, so that the test recording must again be carried out due to the indetermination of the optimum laser power. However, in the event of the execution of the sequential recording of the sequential data such as acoustic data, the test recording processing takes place at the time of change of the area resulting in the effective range of the optimum laser power determined by the test recording. Therefore, a longer time is required to issue a completion report after the reception of a write command from the host, making it difficult for the sequential data to stand by too long, which may possibly result in host recording errors.

SUMMARY OF THE INVENTION

According to the present invention there is provided a storage apparatus capable of preventing any interruption or delay of processing attributable to the test recording upon the area change in the recording of sequential data beyond the effective range area of the optimum laser power determined by the test recording.

The storage apparatus of the present invention comprises an optimum condition setting processing unit and a setting unit. The optimum condition setting processing unit divides a medium into a plurality of optimum condition effective areas and determines optimum conditions used in recording or regeneration in each of the plurality of areas. The setting control unit, when judging a possibility of a migration to an adjacent area, provides a control of the optimum condition setting processing unit so that the optimum conditions for use in the adjacent area are determined in advance. More specifically, for each of a plurality of optimum condition effective areas of a medium segmented in a predetermined direction of the medium, the optimum condition setting processing unit performs optimum condition setting processing on the medium to determine optimum conditions used in recording or regeneration in each area. When during the recording or regeneration of data in an optimum condition effective area, a migration is judged- of data recording or regeneration to an adjacent next optimum condition effective area, the setting control unit provides a control of the optimum condition setting processing unit to allow execution of the optimum condition setting processing of the next optimum condition effective area so that the optimum conditions are determined in advance. As used herein, the optimum condition setting processing includes setting an optimum power of a light beam emission power for any one of recording, regeneration and erase for example or includes setting an optimum magnetic field. The setting control unit allows a separate execution of the optimum condition setting processing of the next optimum condition effective area. For the determination of e.g., the laser power as the optimum condition to be performed at every change of the optimum condition effective area on the medium, a lot of time is required due to plural-times repetition of the erase, recording and regeneration. Hence, in the present invention, when coming closer to the next optimum condition effective area, the next optimum condition setting processing is executed in a separate manner so that the optimum laser power is determined in advance before entering the next area, thereby obviating the delay or interruption of the processing of sequential data.

In synchronism with the reception of a command by a predetermined number of times from a host, the setting control unit allows a separate execution of the optimum condition setting processing of the next test recording effective area. For example, at every time the write command of recording of the sequential data is received 100 times, the optimum condition setting processing is separately executed so as to disperse the delay of the command processing attributable to the separate processing of the test recording performed previous to the write command, to thereby relieve the influence. The setting control unit makes a judgment of being processing of sequential data when recording or regeneration target blocks are substantially continuous along a track of the medium. More specifically, the setting control unit makes a judgment of being processing of sequential data when relative to a last track for the most recent recording or regeneration, a leading track for the current recording or regeneration lies within a prescribed number of tracks and when this continues over a prescribed number of times. In this case, the optimum condition effective area is composed of a single zone or a plurality of zones. The zone is a zone (ZCAV) or band that is recorded or regenerated with a constant angular velocity. In cases where the test recording effective area of the optical disk is composed of a single zone or a plurality of zones, the setting control unit makes a prediction and judgment of a migration of continuous recording or regeneration to the next test recording effective area when recording or regeneration of the sequential data migrates to a zone adjacent anteriorly to the next test recording effective area. More specifically, it makes a prediction and judgment of a migration of continuous recording or regeneration to the next test recording effective area when the sequential data recording or regeneration migrates to the latter half of a zone adjacent anteriorly to the next test recording effective area.

The above and other objects, features and advantages of the present invention will become more apparent from the following detailed description when read in conjunction with the accompanying drawings.

BRIEF DESCRIPTION OF THE DRAWINGS

FIG. 2 is an explanatory diagram of the internal structure of the apparatus having an MO cartridge loaded therein;

FIG. 3 is a block diagram of a laser diode control circuit of FIGS. 1A and 1B;

FIGS. 5A to 5J are timing charts of the signal, the emission current, the deduction current and the monitor current by PPM recording of the present invention in the direct overwrite medium;

FIG. 6 is a function block diagram of optimum condition setting processing of the present invention implemented by an MPU of FIGS. 1A and 1B;

FIG. 7 is an explanatory diagram of a power table of FIG. 6;

FIGS. 11A and 11B are flowcharts of recording/regeneration processing in accordance with the present invention;

FIGS. 13A and 13B are flowcharts of an example of the separate execution for setting the optimum condition of the laser power in the adjacent area of FIG. 12;

FIGS. 14A and 14B are flowcharts of another example of the separate execution for setting the optimum laser power in the adjacent area of FIG. 12;

DETAILED DESCRIPTION OF THE PREFERRED EMBODIMENTS

Figure 1A:
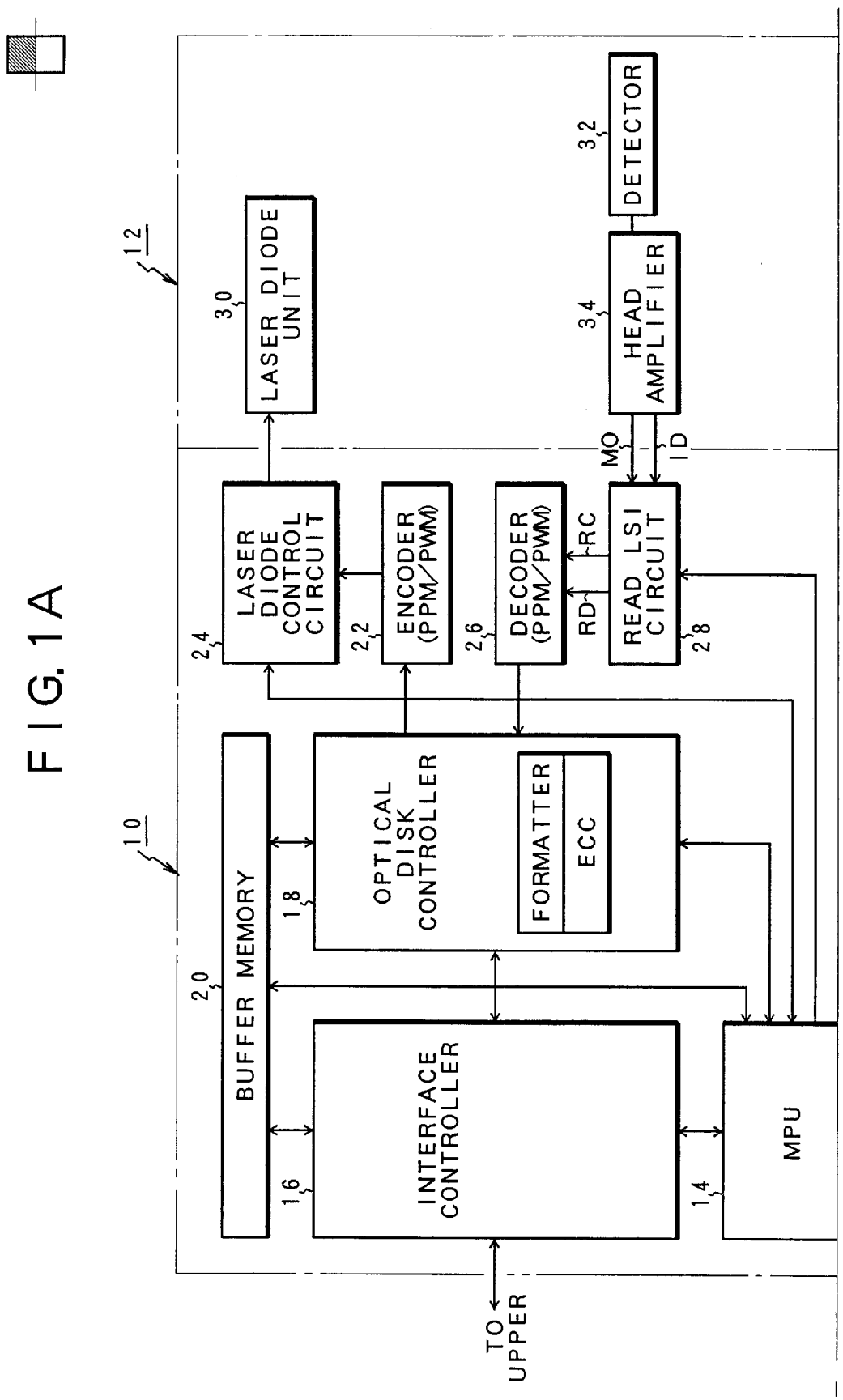
FIGS. 1A and 1B are block diagrams of an optical disk drive in accordance with the present invention.
Figure 1B:
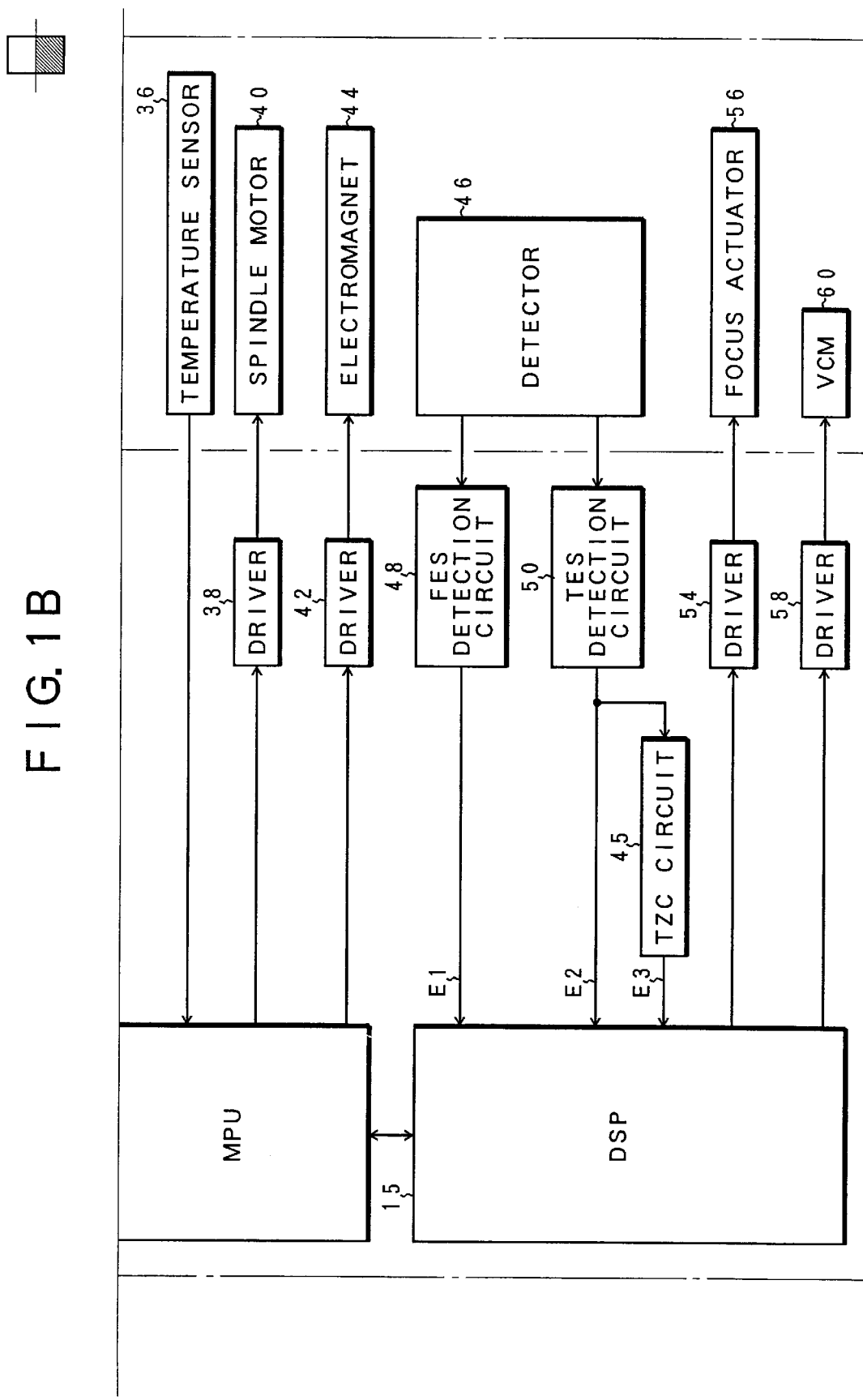

FIGS. 1A and 1B are circuit block diagrams of an optical disk drive which is an optical storage apparatus of the present invention. The optical disk drive of the present invention is constituted by a control unit 10 and an enclosure 12. The control unit 10 comprises an MPU 14 for providing an entire control of the optical disk drive, an interface controller 16 for interchanging commands and data with the upper apparatuses, an optical disk controller (ODC) 18 equipped with a formatter required for the data read from and data write to the optical disk medium and with an ECC function (error detection/correction function), and a buffer memory 20. The optical disk controller 18 is associated with an encoder 22 and a laser diode control circuit 24 which serve as a write system, the control output of the laser diode control circuit 24 being fed to a laser diode unit 30 provided in the enclosure 12. The laser diode unit 30 is integratedly provided with a laser diode and a light reception element for monitoring. In this embodiment, a removable MO cartridge medium, i.e., the optical disk for record and regeneration by use of the laser diode unit 30 can be any one of e.g., 128 MB, 230 MB, 540 MB and 640 MB MO cartridge media, direct overwrite 230 MB, 540 MB and 640 MB media, and an MSR (Magnetic Super Resolution) 1.3 GB medium. Among them, 128 MB and 230 MB MO cartridge media employ a pit position modulation recording (PPM recording) in which data are recorded correspondingly to the presence or absence of a mark on the medium. The medium recording format is a ZCAV and the 128 MB medium includes one zone. On the other hand, the 540 MB, 640 MB and 1.3 GB MO cartridge media providing a high density recording employ a pulse width modulation recording (PWM recording) in which data are caused to correspond to the leading edge and trailing edge of the mark. The PPM recording is called a mark recording and the PWM recording is called an edge recording.

In this case, the difference in the storage capacity between the 640 MB medium and the 540 MB medium arises from the difference in the sector capacity. When the sector capacity is 2 KB, 640 MB medium results, whereas when it is 512 B, 540 Mb medium results. The medium recording format is a ZCAV, and the 230 MB, 640 MB, and 540 MB and 1.3 GB media include 10 zones, 11 zones, and 18 zones, respectively. In this manner, the optical disk drive of the present invention can be adapted for the 128 MB, 230 MB, 540 MB, 64 MB and 1.3 GB storage capacity MO cartridges and further for the direct overwrite medium cartridge. Accordingly, when loading the MO cartridge into the optical disk drive, the ID portion of the medium is first read so that the MPU 14 can recognize the medium type from the pit interval and post the optical disk controller 18 on the result of type recognition. Thus, the MPU 14 performs the formatter processing corresponding to the PPM recording if it is 128 MB or 230 MB but performs the formatter processing corresponding to the PWM recording if it is 230 Mb, 540 MB, 640 MB or 1.3 GM medium.

A decoder 26 and a read LSI circuit 28 are provided as a read system for the optical disk controller 18. By way of a head amplifier 34, the read LSI circuit 28 receives as an ID signal and an MO signal a light reception signal of a return light of a beam from the laser diode 30 by a detector 32 provided in the enclosure 12. The read LSI circuit 28 is provided with circuit functions such as an AGC circuit, a filter, a sector mark detection circuit, a synthesizer and a PLL in order to create read clocks and read data from the input ID signals and MO signals and to provide as its output to the decoder 26. Due to the adoption of the zone CAV as the medium recording system by the spindle motor 40, the MPU 14 issues a read clock in the form of a clock having a frequency corresponding to the zone, to the synthesizer included in the read LSI circuit 28. Here, in response to the medium type by the optical disk controller 18, the modulation system of the encoder 22 and the demodulation system of the decoder 26 are switched to the PPM recording modulation and demodulation systems for the 128 MB medium and 230 MB medium. On the other hand, switching is made to the PWM recording modulation and demodulation systems for the 540 MB medium, 640 MB medium and 1.3 GB medium.

The MPU 14 receives a detection signal from a temperature sensor 36 provided in the enclosure 12. On the basis of the environmental temperature within the interior of the apparatus detected by the temperature sensor 36, the MPU 14 provides a control so as to keep the read, write and erase light emission powers in the laser diode control circuit 24 at optimum values. In order to provide a control for optimizing the light emission powers, the present invention performs an optimum condition setting process (test write processing) in which the 540 MB medium, 640 MB medium and 1.3 GB are each segmented in the medium radial direction into a plurality of areas resulting in test recording effective range and in which upon the receipt of the first write command from the host to each area, the ECC function is cancelled after the recording of the test pattern on the test track within the area so that the optimum laser power is determined while judging the number of errors regenerated. The present invention further performs a segmentation test recording in which the optimum condition setting process is segmented into a plurality of steps so that the segmentation process is carried out in sequence upon the receipt of a write command from the host and in which if the execution time exceeds a predetermined time, the segmentation process is suspended so that upon the receipt of the next write command from the host the test recording segmentation process is executed from the suspended step. Furthermore, the present invention performs a process in which during the processing of the sequential data within a certain area, if it is judged that the current area comes closer to the adjacent area, each time receiving a write command from the host, the test recording is segmentation executed for determining the optimum laser power of the next area so that the optimum laser power of the next area is determined before the area switching by the sequential data processing. Then, by way of a driver 38 the MPU 14 provides a control of a spindle motor 40 provided in the enclosure 12. Since the MO cartridge recording format is the ZCAV, the spindle motor 40 is rotated at a constant velocity of 3,600 rpm for example. By way of a driver 42 the MPU 14 further provides a control of an electromagnet 44 provided in the enclosure 12. The electromagnet 44 is arranged opposite to the beam irradiation side of the MO cartridge loaded into the interior of the apparatus. The electromagnet 44 feeds an external magnetic field to the medium upon the recording or erase, or upon the regeneration if the ultra-resolution magneto-optical system (MSR medium) is employed.

A DSP 15 implements the servo function for performing beam positioning from the laser diode 30 relative to the medium. To this end, the optical unit in the enclosure 12 is provided with a four-split detector 46 which receives a beam mode light from the medium, with an FES detection circuit (focus error signal detection circuit) 48 generating a focus error signal E1 from the light reception output of the four-split detector 46, for the input to the DSP 15. A TES detection circuit (tracking error signal detection circuit) 50 generates a tracking error signal E2 from the light reception output of the four-split detector 46, for the input to the DSP 15. The tracking error signal E2 is fed to a TZC circuit (track zero-cross detection circuit) 45 to generate a track zero-cross pulse E3 for the input to the DSP 15. For the beam positioning, the DSP controllably drives a focus actuator 56 and a VCM 64 by way of drivers 54 and 58.

Herein the outline of the enclosure in the optical disk drive is as shown in FIG. 2. The spindle motor 40 is provided in a housing 66, and an MO cartridge 70 is inserted from an inlet door 68 side into the hub of the rotational shaft of the spindle motor 40 so that an internal MO medium 72 is loaded into the hub of the rotational shaft of the spindle motor 40. Below the MO medium 72 of the thus loaded MO cartridge 70 there is provided a carriage 76 that can freely move in the direction across the medium track by means of the VCM 64. On the carriage 76 is mounted an objective lens 80 that receives, via a prism 82, a beam from the semiconductor laser provided in a fixed optical system 78 so as to form a beam spot on the medium surface of the MO medium 72. The objective lens 80 is controllably displaceable in the direction of the optical axis by a focus actuator 56 shown in the enclosure 12 of FIG. 2.

FIG. 3 is a circuit block diagram of the laser diode control circuit 24 provided in the controller 10 of FIG. 1, showing by way of example an MO cartridge medium needing the erase previous to the write. In case of the direct overwrite medium needing no erase, the MO cartridge erase power is replaced by the assist power for speeding up the write power rise upon the direct overwrite. The laser diode unit 30 is integratedly provided with a laser diode 100 and a monitor photodiode 102. The laser diode 100 emits a light as a result of reception of a drive current I at a power supply voltage Vcc so that the optical unit generates a laser beam to be irradiated on the medium surface for the recording/regeneration. The monitor photodiode 102 receives a part of light from the laser diode 100 and provides as its output a light reception signal i0 that is proportional to the light emission power of the laser diode 100. The laser diode 100 is associated with a read power current source 104, an erase power current source 106, a first write power current source 108 and a second write power current source 110 which are connected in parallel so as to allow a flow of a read power current i0, an erase power current I1, a first write power current I2 and a third write power current I3, respectively. More specifically, upon the read power light emission there flows the read power current I0, upon the erase power light emission there flows a current (I0+I1) which is the sum of the read power current I0 and the erase power current I1, and upon the first write power light emission there flows a current (I0+I1+I2) which is the sum of the current and the first write power current I2. Upon the second write power light emission there flows a current (I0+I1+I3) which is the sum of the read power current I0, the erase power current I1 and the second write power current I3. The read power current source 104 is associated with an auto power control unit (hereinafter referred to as APC) 138. A specific target read power is set as a target power for the APC 138 by way of a target DAC register 120 and a DA converter (hereinafter referred to as DAC) 136. The erase power current source 106 is associated with an EP current DAC register and a DAC 140 which serve as an EP current indication unit. The first write power current source 108 is associated with a WP1 current DAC register 124 and a DAC 142 which serve as a WP1 current indication unit. The second write power current source 110 is associated with a WP2 current DAC register 126 and a DAC 144 which serve as a WP2 current indication unit. For this reason, the current of the current sources 104, 106, 108 and 110 can appropriately be varied by setting the DAC indication values for the corresponding registers 120, 122, 124 and 126, respectively. In this case, the emission current source circuit is constituted by the registers, the DAC and a constant current source. The control by the APC 138 is a feedback control for allowing the monitor current im obtained from the light reception current i0 of the photodiode 102 to coincide with the target voltage of the DAC 136 corresponding to the target read power. To this end, in order to feed back the read power corresponding monitor current im to the APC by deducting the light reception current upon the light emission by the erase power, first write power and second write power exceeding the read power, deduction current sources 112, 114 and 116 are provided for the monitor photodiode 102. Any deduction current i1 can be set for the erase power deduction current source 112 by means of an EP deduction DAC register 128 and a DAC 146 which serve as an EP deduction current indication unit. Any deduction current i2 can be set for the first write power deduction current source 114 by means of a WP1 deduction DAC register 130 and a DAC 148 which serve as a WP1 deduction current indication unit. Any deduction current i3 can be set for the second write power deduction current source 116 by means of a WP2 deduction DAC register 132 and a DAC 150 which serve as a WP2 deduction current indication unit. Monitor currents im in the light emission mode of the three deduction current sources i1, i2 and i3 are as follows:

(1) at the read light emission; im=i0

(2) at the erase light emission; im=i0–i1

(3) at the first write power light emission;

$$im=i0-(i1+i2)$$

(4) at the second write power light emission;

$$im=i0-(i1+i3)$$

Thus, by deducting the corresponding deduction current from the light reception current i0, upon any light emission of the erase power, and first and second write powers exceeding the target read power, the monitor current im can flow as the read power corresponding current through a monitor voltage detection resistor 118, for the feedback to the APC 138. The APC 138 provides a control of the read power current source 104 so as to constantly keep the target read power irrespective of the light emission power, thereby implementing the auto power control of the specific erase power, first write power and second write power. As to this deduction current as well, a deduction current source circuit is provided by the register, DAC and a constant current source. The monitor voltage corresponding to the monitor current im by the monitor voltage detection resistor 118 is converted by an AD converter (hereinafter referred to as ADC) 152 into digital data which in turn are fed to a monitor ADC register 134, for the readout to the MPU 14 side. To this end, the ADC 152 and the monitor ADC register 134 provide a measurement unit for the monitor current im.

Although FIG. 3 has shown the case of the MO cartridge needing any erase by way of example, in case of the direct overwrite cartridge medium needing no erase the PWM recording allows the power (RP+PA) which is the sum of the read power RP and the assist power PA to overlie the first write power WP1 and the second write power WP2, whereas the PPM recording allows the power (RP+PA) which is the sum of the read power RP and the assist power PA to overlie the first write power WP1. For this reason, the registers 124, 128, the DACs 142, 146 and the current sources 110, 112 for the erase power of FIG. 3 are replaced by ones for the assist power PA. Naturally, assist power dedicated registers, DACs and current sources may be added thereto. In this case, the first write power WP1 and the second write power of the PWM recording are previously set as the default powers proper to the apparatus corresponding to the medium type. In the test recording of the present invention, the erase, recording and regeneration (ECC cancel) are iterated by a plurality of times while altering the first write power WP1 and the second write power, to determine the write power minimizing the regenerative data error count (or error rate) as the optimum laser power.

Figure 4A:
FIGS. 4A to 4J are timing charts of a signal, an emission current, a deduction current and a monitor current by PWM recording of the present invention in a direct overwrite medium.
Figure 4B:
Figure 4C:
Figure 4D:
Figure 4E:
Figure 4F:
Figure 4G:
Figure 4H:
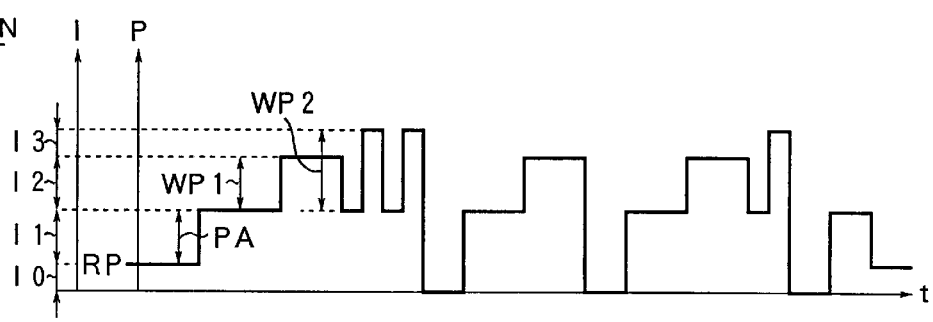
Figure 4I:
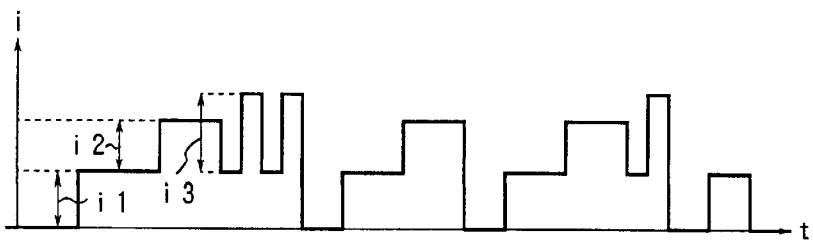
Figure 4J:

FIGS. 4A to 4H are time charts of a signal, an emission current and a deduction current of the PWM recording effected in the laser diode control circuit 24 of FIG. 3, showing the direct overwrite 540 MB and 640 MB cartridge media needing no erase by way of example. If the write data of FIG. 4B are given in synchronism with the write gate of FIG. 4A, then the write data are converted into the pulse width data of FIG. 4D in synchronism with the write clock of FIG. 4C. On the basis of this pulse width data, an assist pulse is generated as shown in FIG. 4E and further a first write pulse is generated as shown in FIG. 4F. A second write pulse of FIG. 4G is then generated. The second write pulse has the pulse number corresponding to the pulse width of the pulse width data of FIG. 4D. For example, the foremost pulse width data are indicative of a pulse width of four clocks, the next pulse width data indicate a pulse width of two clocks, and the next pulse width data indicate a pulse width of three clocks. Following the first write pulse of FIG. 4F, correspondingly to this the second write pulse of FIG. 4G generates two pulses for the four clock width of the foremost data, zero pulse for the next two clock width, and one pulse for the third three clock width so that the information indicative of the pulse width is recorded. FIG. 4H shows an emission current and a power based on the assist pulse, first write pulse and second write pulse of FIGS. 4E, 4F and 4G, respectively. First, the read current flows at all times for DC emission by the read power PR. For this reason, an emission current (I0+I1) flows in synchronism with the assist pulse, which results in an increase by the assist power PA. Then an emission current I2 is added at the timing of the first write pulse to achieve an increase by the first write power WP1. An emission current I3 is further added at the timing of the second write pulse to achieve (I0+I1+I3) for an increase by the second write power WP2. In synchronism with this emission current of FIG. 4H, a deduction current shown in FIG. 4I flows into the deduction current sources 112, 114 and 116 of FIG. 3. More specifically, a deduction current i1 flows that corresponds to the increase by the assist power PA; a deduction current (i1+i2) flows that is obtained by adding the deduction current i2 corresponding to the increase by the first write power WP1; and a deduction current (i1+i3) flows that is obtained by adding the deduction current i3 corresponding to the increase by the second write power WP2. For this reason, the monitor current im of FIG. 4J is a value obtained by deducting the deduction current of FIG. 4H from the light reception current i0 corresponding to the emission current and the emission power of FIG. 4H, whereupon in spite of the duration of the light emission, it is converted at all times into a constant current corresponding to the read power and fed back to the APC 138.

FIGS. 5A to 5J are timing charts of a signal emission current, a deduction current and a monitor current upon the PPM recording in the case of the direct overwrite 230 MB medium by way of example. If write data of FIG. 5B are given in synchronism with a write gate of FIG. 5A, then pulse width data of FIG. 5D are generated in synchronism with a write clock of FIG. 5C. Correspondingly to this pulse width data, an assist pulse of FIG. 5E and a first write pulse of FIG. 5F are generated. In the PPM recording, a second write pulse of FIG. 5G is out of use. The emission power P is obtained by allowing the emission current of FIG. 5H by the assist pulse and the first write pulse to flow through the laser diode. Used in the PPM recording is a power (PR+PA) obtained by adding the assist power PA to the read power PR at the timing of the assist pulse. In this case, however, the assist power PA is the read power PR itself (PA=PR) so that the light emission can be kept by the read power PR due to the read power current I0 even at the timing of the assist pulse. At the timing of the first write pulse, the emission current is increased by (I1+I2), resulting in a power obtained by adding the assist power PA to the first write power WP1. The deduction current of FIG. 5I indicates that a deduction current (i1+i2) flows at the emission timing of the first write pulse. Thus, the monitor current im of FIG. 5J is kept at all times so as to substantially coincide with the light reception current of the read power. In this case, the PPM recording write power WP1 is previously set as a default power proper to the apparatus corresponding to the medium type. In the test recording of the present invention, the erase, recording and regeneration (ECC cancel) are iterated by a plurality of times while altering the write power WP1, to determine as the optimum laser power the write power minimizing the regenerative data error count (error rate).

FIG. 6 is a function block diagram of the optimum condition setting processing in accordance with the present invention, which is implemented by the MPU 14 of the optical disk drive of FIGS. 1A and 1B. The optimum condition setting processing function of the present invention is implemented by an optimum condition setting processing unit 160, a setting control unit 162, an access execution unit 164, a power table 166 and a group of registers 168. The optimum condition setting processing unit 160 includes an erase processing unit 170, a write processing unit 172, a read processing unit 174 and an optimum power determination unit 176. In case of the overwrite medium, the processing of the erase processing unit 170 is not required. The optimum condition setting processing unit 160 performs the optimum condition setting processing on the medium for each of the plurality of areas obtained by radially segmenting the optical disk medium and determines the optimum values of the laser power and magnetic field for use in the recording, regeneration and erase. This optimum condition setting processing by the optimum condition setting processing unit 160 is controlled by the setting control unit 162. The setting control unit 162 includes a batch execution control unit 178, a separate execution control unit 180 and an adjacent area separate execution control unit 182. For a certain area on the optical disk medium, the batch execution control unit 178 operates in sequence the erase processing unit 170, write processing unit 172, read processing unit 174 and optimum power determination unit 176 provided in the optimum condition setting processing unit, to perform the batch processing determining the optimum power by the test recording and processing determining the optimum magnetic field as needed. This optimum condition setting processing by the batch execution control unit 178 is carried out when receiving a first write command from the host after loading the optical disk medium into the apparatus to record data on a certain area for the first time. During the operation after execution of the first optimum condition setting processing, the batch execution of the optimum condition setting processing is controlled when at every certain period of time there lies a variance in the temperature as large as 4° C. or more for example. In case of a small variance in the temperature, e.g., not less than 3° C. and less than 4° C. at every certain period of time after the batch execution of the optimum condition setting processing by the first write command in the batch execution control unit 178, the separate execution control unit 180 separately executes the erase processing, write processing and read processing (including the optimum power determination processing) by the optimum condition setting processing unit 160. The separate execution interval of the erase processing, the write processing and the read processing including the optimum power determination processing is previously set as a constant elapsed time, e.g., at every elapsed time of 500 ms. The batch execution control unit 178 and the separate execution control unit 180 work for the areas in which there lies a target track of the write command from the host. When a migration is judged of the continuous recording or regeneration to the adjacent next optimum condition effective area during the recording or regeneration (sequential processing) of the sequential data in a certain optimum condition effective area, the adjacent area separate execution control unit 182 allows a separate execution of the optimum condition setting processing of the next optimum condition effective area. This separate execution of the optimum condition setting processing by the adjacent area separate execution control unit 182 is carried out when the following two conditions are satisfied:

(I) Continuous data recording or regeneration is carried out in the current area; and (II) The recording or regeneration by a command from the host is carried out at a position in front of and in close vicinity to the adjacent area.

If the above two conditions, i.e., the sequential data being processed and the position being in close vicinity to the adjacent area are satisfied and the optimum condition setting processing in the adjacent area is needed, then the processing for separately executing the adjacent area optimum condition setting processing in synchronism with the write command from the host to the adjacent area is iterated. Herein, the sequential data recording by the host command is typically a continuous process in which recording of a plurality of blocks predefined by one write command from the host is carried out and in which recording of a plurality of blocks is carried out for the subsequent blocks by one write command from the next host. Namely, the sequential data recording is a process in which the write command target blocks from the host are continuous. Thus, the judgment of the sequential processing by the adjacent area separate execution control unit 182 includes figuring out the difference between the first track number obtained from the target block of the current write command and the last track number of the target block of the most recent write command and judging that it is the sequential data processing if the difference is zero, i.e., the track numbers are continuous, or if the difference is within the predetermined value, e.g., two tracks. That is, the sequential processing is judged by the following expression:

0≧ (last track number of the most recent write command)−(first track number of the current write command)≧ 2

Then, the judgment of close vicinity to the adjacent area by the adjacent area separate execution control unit 182 includes reading the track number recorded in the ID provided in the track being currently recorded, to judge the close vicinity to the next area from this track number. The optical disk medium is formed with a spiral guide groove for tracking the laser beam, with a land which is a region defined between adjacent grooves for recording and regenerating data. Upon the medium formation, the land is provided with an ID section consisting of a track number and a sector number. The portion sandwiched by the IDs recorded on the lands is a sector or a block and one track is formed by a plurality of continuous sectors or blocks. The spiral track extends from the inner periphery toward the outer periphery in case of the 230 MB, 540 MB, 640 MB format optical disk media, with the ID section track address increasing from the inner periphery toward the outer periphery. As opposed to this, in case of the 1.3 GB format optical disk medium, the spiral track extends from the outer periphery toward the inner periphery, with the ID section track address increasing from the outer periphery toward the inner periphery. The ID section is fixedly formed upon the molding of the optical disk medium. In case of the optical disk medium, it is radially segmented into one or plural zones. Similarly to the ID section, this zone is also fixedly formed upon the molding of the medium. Thus, the relationship between the zone and the track address is a fixed one in conformity with the medium format. The optical disk media having 230 MB, 540 MB, 640 MB and 1.3 GB formats have a plurality of radially segmented zones. As used herein, the zone is a ZCAV zone or band which is recorded and regenerated with a constant angular velocity. As opposed to this, the optimum condition effective area subjected to the optimum condition setting processing is a virtual unit within the interior of the apparatus and is merely used for the convenience of the apparatus interior processing. For this reason, the area providing the optimum condition effective range is composed of a plurality of zones. In case of the 540 MB optical disk medium for example, it is radially segmented into 18 zones by the medium format. For those 18 zones, in this embodiment, the area providing the optimum condition effective range is divided into three areas for management, i.e., an inner peripheral area including the zones 1 to 6, an intermediate area including the zones 7 to 12, and an outer peripheral area including the zones 13 to 18. For each area, determination is made of the optimum data power by the optimum condition setting processing. The result of the optimum condition setting processing in each area, i.e., the optimum data power determined by the optimum condition setting processing can be effective within that area only. Typically, for each optical disk medium capable of being loaded, the apparatus control firm has a record laser power which is determined as a default and which is a proper recording condition by the medium radial position of the target block (target sector) on which recording is made by a write command and by the in-apparatus temperature. However, the optimum recording conditions determined as the default may include any offset due to apparatus-to-apparatus variances in the recording performances, variances in the temperature read values, variances of the recording sensitivities for each optical disk medium, and differences between the apparatus temperature sensor read values and the actual medium temperature. Thus, the optimum condition setting processing unit 160 of the present invention finds out the optimum write power by the execution of the optimum condition setting processing with the write power varied around the write power as the default recording conditions determined by the apparatus. For this reason, the optimum data power determined by the optimum condition setting processing is determined in the form of the proportional coefficient relative to the default write power. This proportional coefficient for the default write power determined by the optimum condition setting processing is called conveniently a power offset. The power offset determined by this optimum condition setting processing becomes effective within the optical disk medium area. Independent power offsets are retained as a result of the independent optimum condition setting processing for each of the inner peripheral area, intermediate area and outer peripheral area. The default write power may vary depending on the radial position within the area and the optimum write power may be the value obtained by multiplying the default write power by the power offset (proportional coefficient) as the optimum condition determined by the optimum condition setting processing. Thus, in cases where the area is switched and the optimum condition setting processing is executed in the next area, there is obtained a power offset that results in a proportional coefficient in the new area. As a result of such the optimum condition setting processing in which the optimum condition setting processing unit 160 is controlled by the setting control unit 162, the power table 166 stores, in a manner corresponding to the medium type of the optical disk loaded, the area, zone, default erase power, default write power, and a power offset which is a proportional coefficient for obtaining the optimum write power determined by the optimum condition setting processing, and control information on a flag indicative of the presence or absence of the necessity for the optimum condition setting processing.

FIG. 7 shows a specific example of the power table 166 of FIG. 6, in the case of the 540 MB optical disk medium as the medium type. This power table 166 includes three areas resulting in the optimum condition setting processing effective range, i.e., the inner peripheral area 184, the intermediate area 186 and the outer peripheral area 188. It is radially segmented into 18 zones of zones 1 to 18 by the medium format. The inner peripheral area 184 is given zone numbers 1 to 6, the intermediate area 186 being given zone numbers 7 to 12, and the outer peripheral area 188 being given zone numbers 13 to 18. Stored in a manner corresponding to each zone are default erase powers DEP1 to DEP18 and the default write powers DWP1 to DWP18 which are the optimum condition proper to the apparatus. Further stored in a manner corresponding to the inner peripheral area 184, the intermediate area 186 and the outer peripheral area 188 are power offsets POFS1 to POFS3 which are proportional coefficients determined by the optimum condition setting processing. All of these power offsets POFS1 to POFS3 result in 1 immediately after the loading of the medium, whereupon the default erase power or the default write power is intactly used. Then when the optimum condition setting processing is carried out in synchronism with the write command, the value of the power offset calculated as the result is stored therein. Flags FL1 to FL3 set the presence or absence of the necessity for the optimum condition setting processing in each area. Flag on sets the necessity for the optimum condition setting processing in each area and flag off cancels the necessity for the optimum condition setting processing. Upon the loading of the optical disk medium, the flags FL1 to FL3 are all set into on state needing the optimum condition setting processing. Once the optimum condition setting processing is carried out, the flags FL1 to FL3 are turned off, and if the requirements for the optimum condition setting processing are satisfied, the flags go on. For the judgment of he necessity for the optimum condition setting processing, the flag on off setting is made in response to the temperature difference at that time, each time a constant time elapses from the most recent optimum condition setting processing. The set values determined by the optimum condition setting processing are cleared upon the unloading of the medium or upon the power off.

Figure 8:
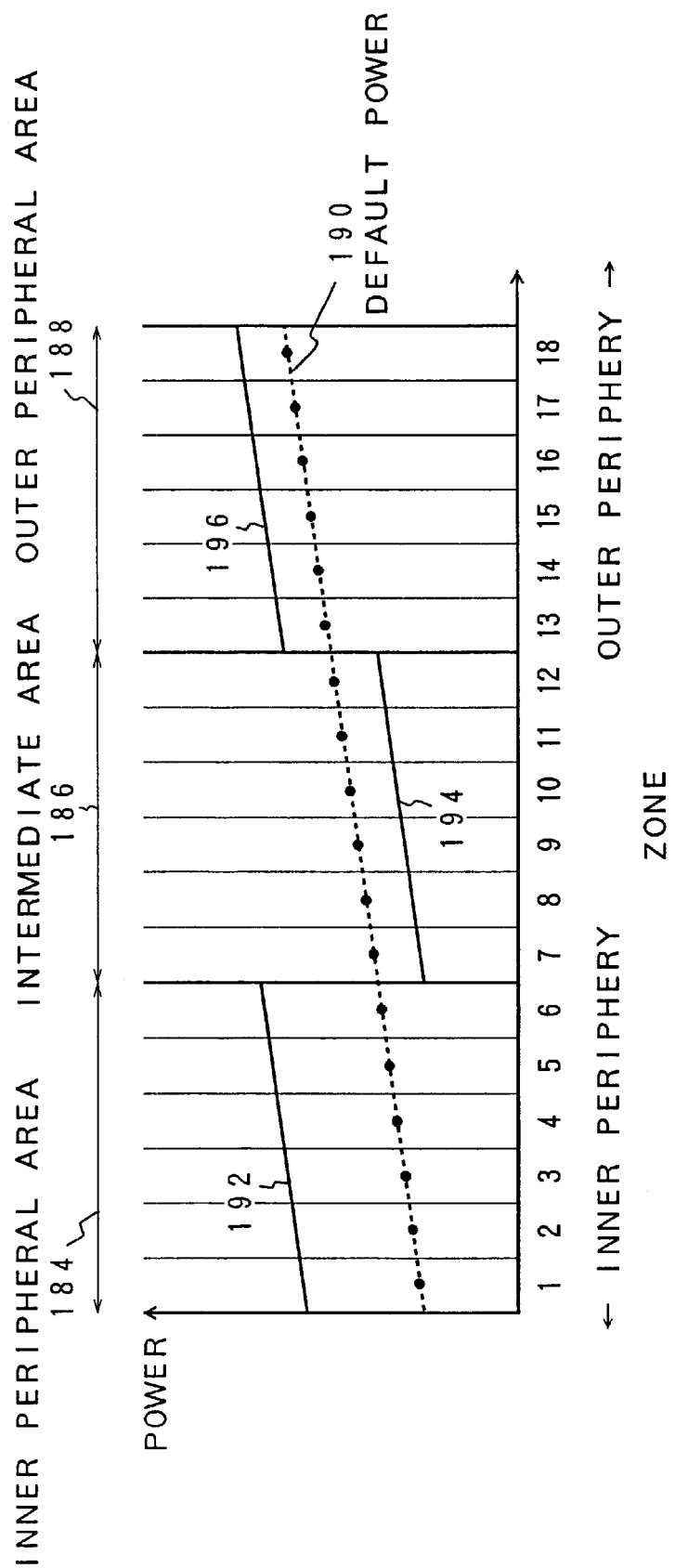
FIG. 8 is an explanatory diagram of a default power for 540 MB optical disk medium zones and areas and an optimum power determined by the optimum condition setting processing.

FIG. 8 shows the relationship among the default power relative to the zone and area of the optical disk medium of the 540 MB format in conformity with the contents of the power table 166 of FIG. 7, and the power offset determined by the optimum condition setting processing. The optical disk medium represented by the axis of abscissas is radially divided into 18 zones which are classified into three zones for management, i.e., the inner peripheral area 184 consisting of the zones 1 to 6, the intermediate area 186 consisting of the zones 7 to 12, and the outer peripheral area 188 consisting of the zones 13 to 18. A default power 190 proper to the apparatus has a characteristic indicated by a broken line. This default power 190 is determined with respect to the center track of the zones 1 to 18 for example. By the linear interpolation of the two default power values of the foremost track of the zone corresponding to the power, the default power in the track of the medium radial position therebetween is obtained. The optimum condition setting processing is independently performed on an area-to-area basis. The test write track of each area subjected to the optimum condition setting processing is the center track of the leading zone of each area for example. That is, in the inner peripheral area 184 the center track of the zone 1 is subjected as the test write track to the optimum condition setting processing. In the intermediate area 186 the center track of the leading zone 7 is subjected as the test write track to the optimum condition setting processing. Furthermore, in the outer peripheral area 188 the center track of the leading zone 18 is subjected as the test write track to the optimum condition setting processing. The optimum condition setting processing is a process for obtaining as the power offset the proportional coefficient for the default power in each area. More specifically, the optimum laser powers 192, 194 and 196 indicated by the solid lines are obtained for each area of FIG. 8 by multiplying the default power by the obtained power offset (proportional coefficient). The optimum laser powers 192, 194 and 196 obtained by the optimum condition setting in this manner are effective only in the areas 184, 186 and 188, respectively.

Description will then be made of the separate optimum condition setting processing effected by the adjacent area separate execution control unit 182 of FIG. 6 for the areas of FIG. 8. In cases where the recording of the sequential data is made on the optical disk medium track, e.g., where a sequential recording is made from the leading track of the inner most peripheral zone 1 of FIG. 8 toward the outer periphery, the erase, the write and the read processing containing the optimum power determination processing are collectively carried out by the batch execution control unit 78 of FIG. 6 upon the first write command for the inner peripheral area 184, whereby determination is made of the power offset effective for the inner peripheral area 184 so that the optimum laser power 192 is obtained. When entering the next intermediate area 186 after the completion of the sequential recording on the track of the inner peripheral area 184, it becomes necessary to newly determine the power offset for figuring out the optimum laser power 194 by the optimum condition setting processing. The determination of the power offset by this optimum condition setting processing may take a lot of time since the power offset must be determined as the proportional coefficient for providing the optimum power after the iteration of the erase processing, write processing and the read processing by a plurality of times. Thus, in the present invention, the sequential data are recorded in the currently processed inner peripheral area 184, and when it is judged that switching is soon made to the next intermediate area 186, the optimum condition setting processing determining the power offset for obtaining the optimum laser power for use in the next intermediate area 186 is separately executed in synchronism with the write command for the inner peripheral area 184. In this manner, by separately executing the optimum condition setting processing during the processing of the sequential data of the inner peripheral area 184 before entering the next intermediate area 186 and by determining the power offset for obtaining the optimum laser power 194 for use in the next intermediate area 186, it is possible to eliminate the necessity for the optimum condition setting processing upon the switching to the intermediate area 186 and to securely prevent the situation of delayed or interrupted sequential data processing as a result of extended optimum condition setting processing time to be performed in synchronism with the first write command on the intermediate area 186. This judgment of the close vicinity to the adjacent area is made when, during the sequential processing of the inner peripheral area 184 for example, a write command is received on the track of the zone 6 anterior and adjacent to the intermediate area 186 resulting in an adjacent area, more specifically, when a write command is received of the sequential access of the latter half track of the zone 6. The separate execution of the optimum condition setting processing for the adjacent intermediate area 186 in synchronism with the write command on the latter half track of the zone 6 is performed every time the write command is received on the inner peripheral area by a predetermined number of times. For example, every time the write command is received by 100 times, the separate execution is carried out of the optimum condition setting processing on the adjacent intermediate area 186. This allows the dispersion of the separate execution of the optimum condition setting processing for the adjacent intermediate area 186 in synchronism with the write command on the latter half track of the zone 6, thereby enabling the wait time of the host side for the write command termination to be dispersed and reduced. The separate execution of the optimum condition setting processing for the adjacent intermediate area 186 upon the recording by the write command on the latter half track of the zone 6 is made on the test write track in the leading zone 7 of the intermediate area 186. As for the switching from the next intermediate area 186 to the outer peripheral area 188, when the write command target track of the sequential data processing in the intermediate area 186 reaches the latter half of the adjacent zone 12 anterior to the outer peripheral area 188, the optimum condition setting processing is separately carried out for determining the power offset (proportional coefficient) obtaining the optimum laser power for the test track of the leading zone 18 of the outer peripheral area 188.

Figure 9:
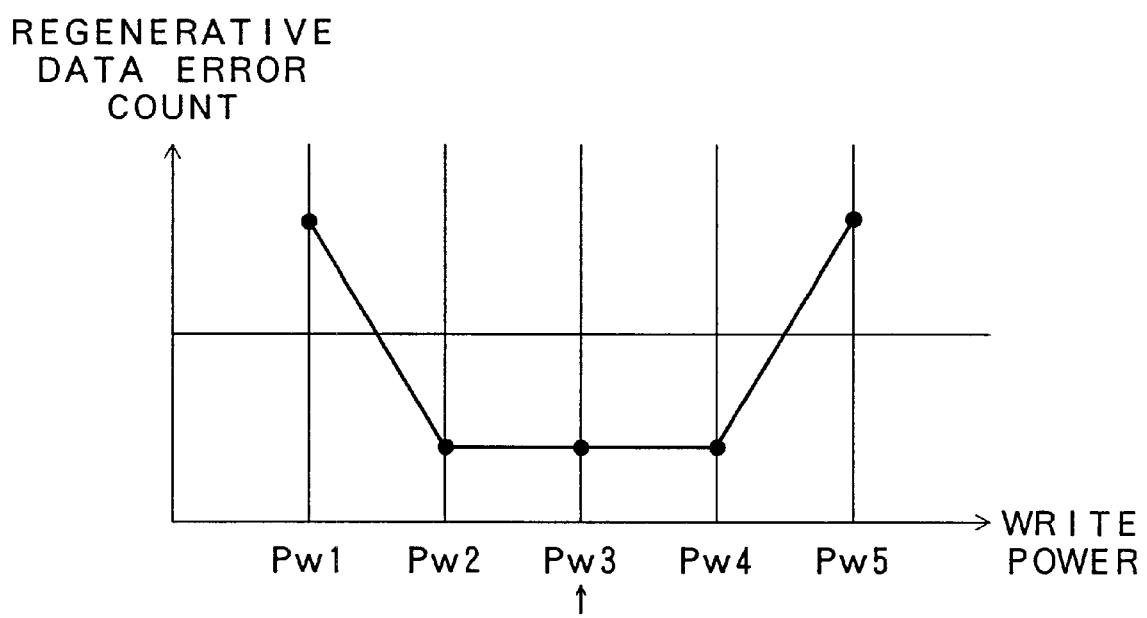
FIG. 9 is a characteristic diagram of a regenerative data error count relative to the variation of a write power by the optimum condition setting processing of the present invention.

FIG. 9 shows the relationship between the variation of write power by the optimum condition setting processing unit 160 of FIG. 6 and the regenerative data error count obtained every time. The optimum condition setting processing includes determining the power offset as the proportional coefficient providing the optimum laser power after the iteration of the erase, recording and regeneration by a predetermined number of times, which has been experimentally defined, by five times in this embodiment. In this case, the write power is varied five times to Pw1, Pw2, Pw3, Pw4 and Pw5 to perform test data optimum condition setting processing. Then the regenerative data are obtained by regenerating the data with the ECC based error correction function halted after each optimum condition setting processing. The regenerative data are compared on a bit-by-bit basis with the test data used in the optimum condition setting processing to obtain the regenerative data error count. In this case, the regenerative data error count exceeds the threshold TH in the optimum condition setting processing by the first write power Pw1, but lowers to the value less than the threshold TH in the optimum condition setting processing by the second to fourth write powers Pw2, Pw3 and Pw4, and again increases to a value exceeding the threshold TH at the last write power Pw5. In such an event, determined as the optimum write power is the write power Pw3 which is the intermediate value of the three write powers Pw2, Pw3 and Pw4 less than the threshold TH. Then this optimum write power Pw3 is divided by the default power to obtain the proportional coefficient which in turn is used as the power offset for the entry into the power table 166 of FIG. 6.

Figure 10:
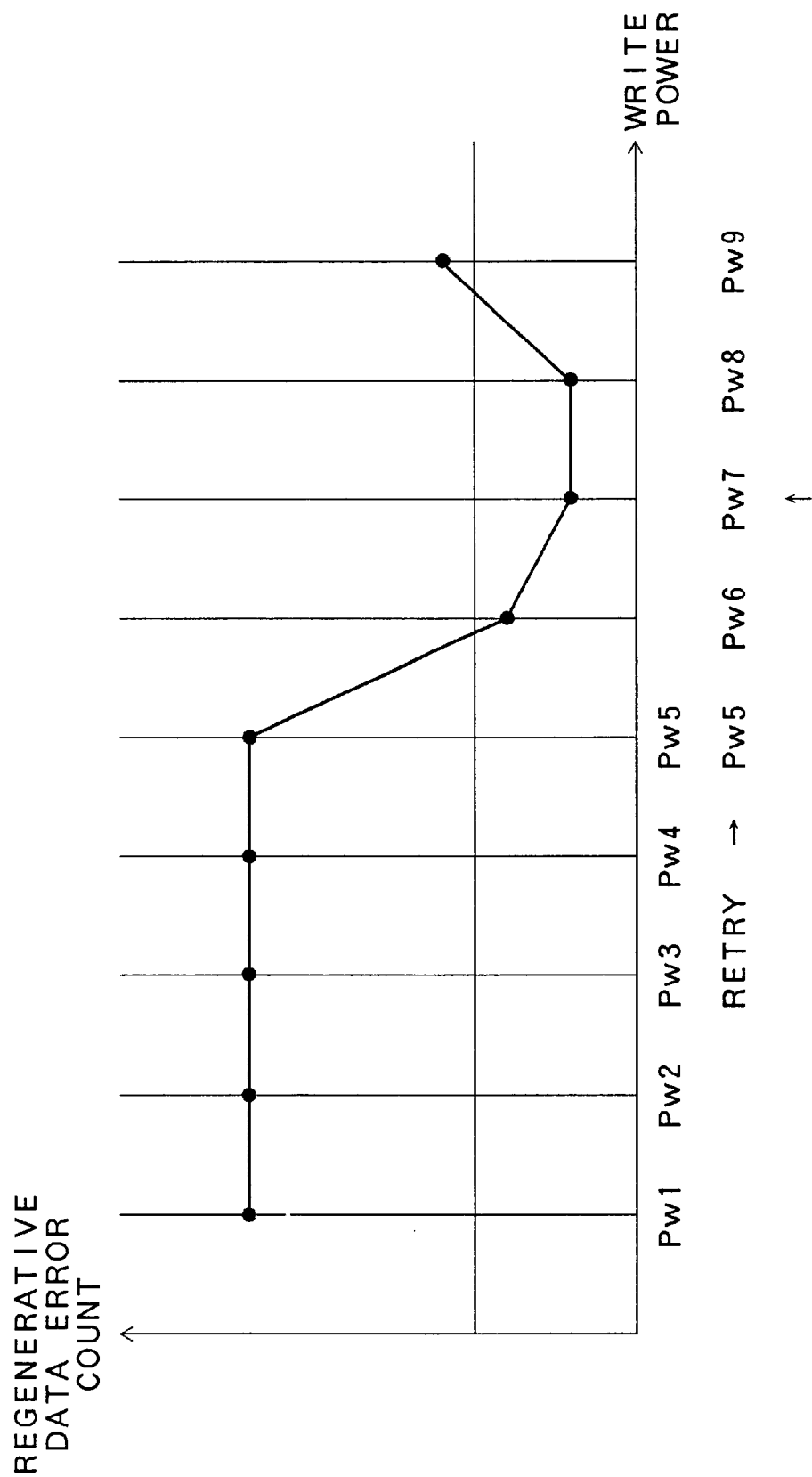
FIG. 10 is a characteristic diagram of the regenerative data error count relative to the variation of the write power in the case of execution of a retry in the optimum condition setting processing of the present invention.

FIG. 10 shows the relationship between the write power and the regenerative data error count in cases where no optimum write power has been obtained in a single optimum condition setting processing and hence the optimum power has been determined by retry. First, the write power is varied five times to Pw1 to Pw5 for the optimum condition setting processing. The regenerative data error count exceeds the threshold TH at that time so that it is impossible to determine the optimum write power through this optimum condition setting processing. Then as the next retry processing the write power is varied from the last write power Pw5 in the last optimum condition setting processing to Pw6 to Pw9, to obtain the regenerative data error count. Upon this retry, the regenerative data error count less than the threshold TH is obtained at the three write powers Pw6 to Pw8. The middle write power Pw7 is determined as the optimum write power which is divided by the default write power to obtain the proportional coefficient. The thus obtained proportional coefficient is used as the power offset for the entry into the power table 166. As is apparent from FIGS. 9 and 10, in the optimum condition setting processing, the optimum write power is determined after the iteration of the erase, recording and regeneration by five times for example and hence the processing takes a substantial time. Especially, in the event that it is difficult to determine the optimum write power through the first optimum condition setting processing, the optimum write power must be determined by the retry, which results in a further extended processing time. By contrast, in the present invention, the recording of sequential data such as acoustic data or animation data posing the process interruption problem is previously subjected to the separate execution of the optimum condition setting processing for determining the optimum write power when coming closer to the next area from a certain area, in synchronism with the write command of the sequential data recording in the current area, thereby securely preventing the interruption of the sequential processing which may occur by the batch execution of the optimum condition setting processing upon the switching to the next area.

FIGS. 11A and 11B are flowcharts of the processing operations of the optical disk drive of the present invention having the optimum condition setting processing function of FIG. 6. When the optical disk drive is activated, the initialization processing is carried out in step S1. This initialization processing includes setting and adjusting default values and temperature correction coefficients stored in the power table 66 of FIG. 6.

If it is then judged in step S2 that the medium is loaded, the medium type is set into the register 168 so that the table information is specified which corresponds to the medium type in the power table 166. A check is then made in step S3 to see if a host command is received or not. If affirmative, then it is judged in step S4 whether the optimum condition setting processing is required or not in the current area. If the host command is a first write command, then it is judged that the optimum condition setting processing is required in the current area, allowing the procedure to go to step S5 for executing the optimum condition setting processing in the current area. In the case of the first write command, this current area optimum condition setting processing is a batch execution of the optimum condition setting processing by the batch execution control unit 178. When the optimum condition setting processing is once completed, there is a need for the optimum condition setting processing upon the elapse of the effective time. In the event of the presence of a large temperature difference, the optimum condition setting processing is batch executed, whereas in case of a small temperature difference the optimum condition setting processing is separately executed. If a power offset that is a proportional coefficient for obtaining the optimum write power is determined as a result of execution of the optimum condition setting processing of the current area in step S5, then the processing of the write command from the host is executed in step S6 after the entry of the power offset into the power table 166. On the contrary, if it is judged in step S4 that there is no need for the current area optimum condition setting processing, then the separate execution of the optimum condition setting processing is carried out by the adjacent area separate execution control unit 182 of FIG. 6 in steps S7 to S9. First in step S7, it is judged whether it is in the process of the sequential processing and whether it is in the area switching region or not. If it is in the process of the sequential processing and is in the area switching region, then the procedure goes to step S8 to make a check to see if the optimum condition setting processing is needed in the adjacent area. If no optimum condition setting processing is carried out in the adjacent area or if there arises a temperature difference as a result of elapse of the effective time from the last optimum condition setting processing, it is judged that there is a need for the adjacent area optimum condition setting processing, allowing the adjacent area to be subjected to the separate execution of the optimum condition setting processing in step S9. After the completion of the separate execution of the adjacent area optimum condition setting processing, a write command from the host is processed in step S6. After the processing of the write command from the host in step S6, a check is made in step S7 to see if the medium is unloaded or not. If negative, then the procedure returns to step S3 to wait for the next host command. If it is judged in step S7 that the medium is unloaded, then a check is made in step S8 to see if the apparatus has halted or not. If the apparatus halt is absent, then the procedure goes back to step S2 to wait for the next medium loading. If the apparatus halt is present, then the series of processing come to an end.

Figure 12:
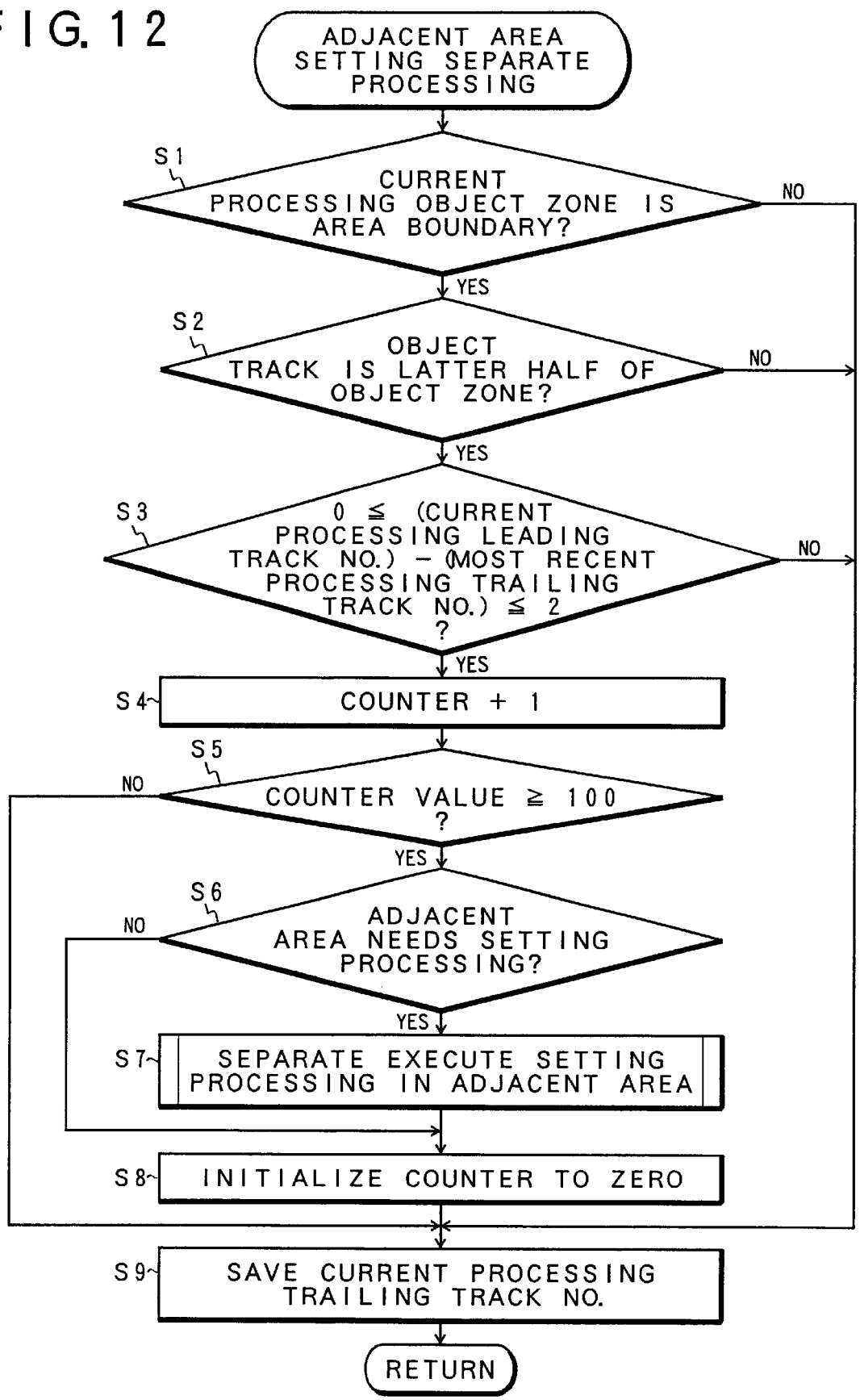
FIG. 12 is a flowchart of separate processing for setting the optimum condition of the adjacent area in FIGS. 11A and 11B.

FIG. 12 is a flowchart showing the details of the control processing effected by the adjacent area separate execution control unit 182 of FIG. 6, which is the processes of the steps S7 to S9 of FIGS. 11A and 11B enclosed by a broken line. In this separate execution of the optimum condition setting processing of the adjacent area, a check is first made in step S1 to see if the objective zone containing the target track to be processed by the currently received write command is an area boundary or not. For example, in the case of the write command for the inner peripheral area 184 of the 540 MB format optical disk medium of FIG. 8, it is checked whether it is the zone 6 anterior and adjacent to the adjacent intermediate area 186. If the area boundary is the objective zone, then the procedure goes to step S2 to check whether the target track is in the latter half of the objective zone. For example, it is judged whether the latter half track of the zone 6 of FIG. 8 is the target track. If the latter half of the objective zone is the target track, then it is judged to be the sequential recording when the value is not less than 0 and not more than 2 that is obtained by subtracting the last track number by the most recent write command processing from the foremost track number processed by the current write command, allowing the procedure to go to step S4. In step S4, the counter is incremented by one that determines the write command number of times by which the separate execution of the optimum condition setting processing is carried out. A check is then made in step S5 to see if the counter value is equal to or more than 100. If the counter value is less than 100, then the procedure skips to step S9 in which the last track number of the current processing is saved allowing a return to the main routine of FIGS. 11A and 11B. If the counter value is not less than 100 in step S5, then the procedure goes to step S6 for checking the presence or absence of the necessity for the adjacent area optimum condition setting processing. More specifically, a check is made of the flag FL2 of the intermediate area resulting in the adjacent area provided in the power table 166 of FIG. 7. If the flag is on, then it is judged that the necessity for the optimum condition setting processing is present, allowing the procedure to go to step S7. In step S7, the adjacent area optimum condition setting processing is separately executed previous to the execution of the write command. The first separate execution of the optimum condition setting processing in the adjacent area is the erase processing effected on the test recording track of the zone 7 by the erase processing unit 170. Then in step S8 the counter is reset to zero, and in step S9 the last track number of the current processing is saved, thereafter allowing a return to the main routine of FIGS. 11A and 11B. For this reason, every time the write command is received 100 times in step S5, the procedure goes from step S6 to step S7 so that the adjacent area optimum condition setting processing is separately executed. The second separate execution is the optimum condition setting processing of the test data by the test write track of the zone 7 effected by the write processing unit 172. The third separate execution is the regenerative processing in the state where the ECC based correction function by the read processing unit 174 of FIG. 6 is halted of the test data written to the test recording track of the zone 7. This is iterated five times while varying the write power as shown in FIG. 9. After the completion of the five-times processing, the optimum power determination unit 176 of FIG. 6 determines as the optimum write power a intermediate value of the write powers not more than the threshold. Then entered into the power table 166 is the power offset in the form of the proportional coefficient obtained by dividing the intermediate value by the default write power.

Figure 13B:
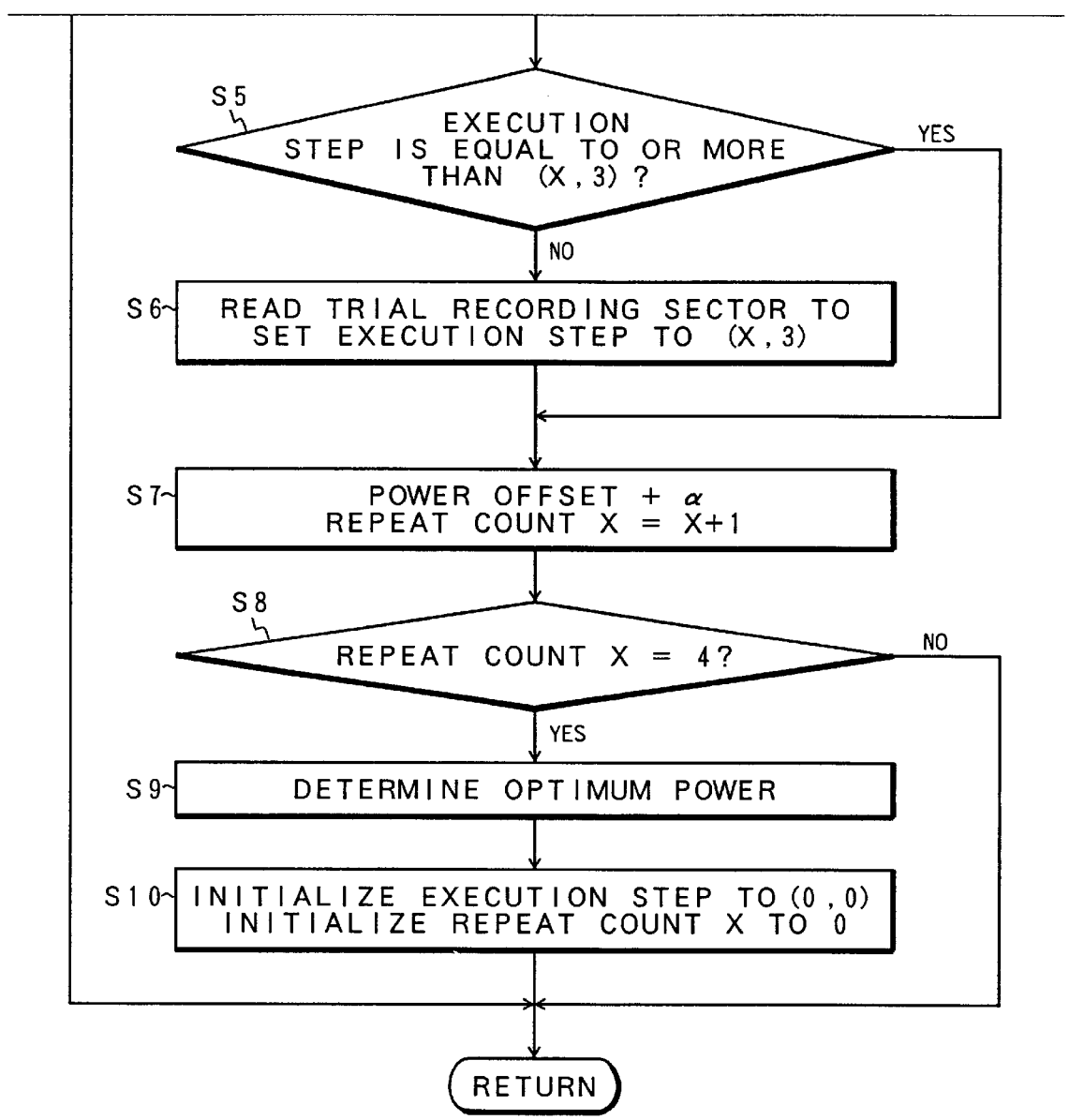

FIGS. 13A and 13B are flowcharts showing the details of the separate execution of the adjacent area optimum condition setting processing in step S7 of FIG. 12. In this adjacent area optimum condition setting separate processing, the execution steps for managing the separate execution include an execution step (X, 1) for the erase, an execution step (X, 2) for the write, and an execution step (X, 3) for the read. As used herein, the left-hand value X in the parentheses of the execution steps indicates the number of times of execution. In this embodiment the erase, write and read are carried out five times so that X varies from 0 to 1, 2, 3 and 4. The right-hand values 1, 2 and 3 in the parentheses of the execution steps indicate the erase, write and read, respectively. First a check is made in step S1 to see if it is equal to or more than the execution step (X, 1). In the first separate execution, since the execution step is (0, 0), the procedure goes to step S2 to erase a test recording sector of the foremost zone of the adjacent area, to thereafter set the execution step to (0, 1) for the return to FIG. 12. In the next separate execution of the adjacent area, since the execution step is (0, 1), the procedure advances from step S1 to step S3. It is less than the execution step (0, 2), so that test data are written onto the test recording sector of the foremost zone of the adjacent area in step S4, allowing the execution step to be set to (0, 2) for the return to FIG. 12. In the third adjacent area separate execution, since the execution step is (0, 2), the procedure advances from steps S1 and S3 to step S5. It is less than the execution step (0, 3), so that the test recording sector of the foremost zone of the adjacent area is read with the error correction function halted in step S6, allowing the execution step to be set to (0, 3) for the advancement to step S7. In step S7, the power offset of the write power is increased by $+\alpha$ for the next optimum condition setting processing, and the repeat count is incremented by 1 to X=1. Then a check is made in step S8 to see if the repeat count reaches X=4, i.e., the number of times of repetition is five times. It is the first time, so that a return to FIG. 12 is made. The same processing is repeated for the second time with the repeat count X=1, the third time with X=2, and the fourth time with X=3. For the fifth time with the repeat count X=4, after the execution of the separate execution of the erase, write and read, it is judged in step S8 whether the repeat count X=4, i.e., the number of times of repetition is 5. Then in step S9 the optimum write power is determined as the intermediate value of the write powers of the error counts equal to or less than the threshold, among the regenerative data error counts for the five write powers obtained at that time. The optimum write power is divided by the default write power to obtain a power offset in the form of the proportional coefficient, for the entry into the power table. After the completion of the determination of the optimum write power in step S9, the execution step is initialized to (0, 0) with the initialization of the repeat count to X=0 in step S10, preparing the separate execution of the next adjacent area optimum condition setting processing.

Figure 14B:
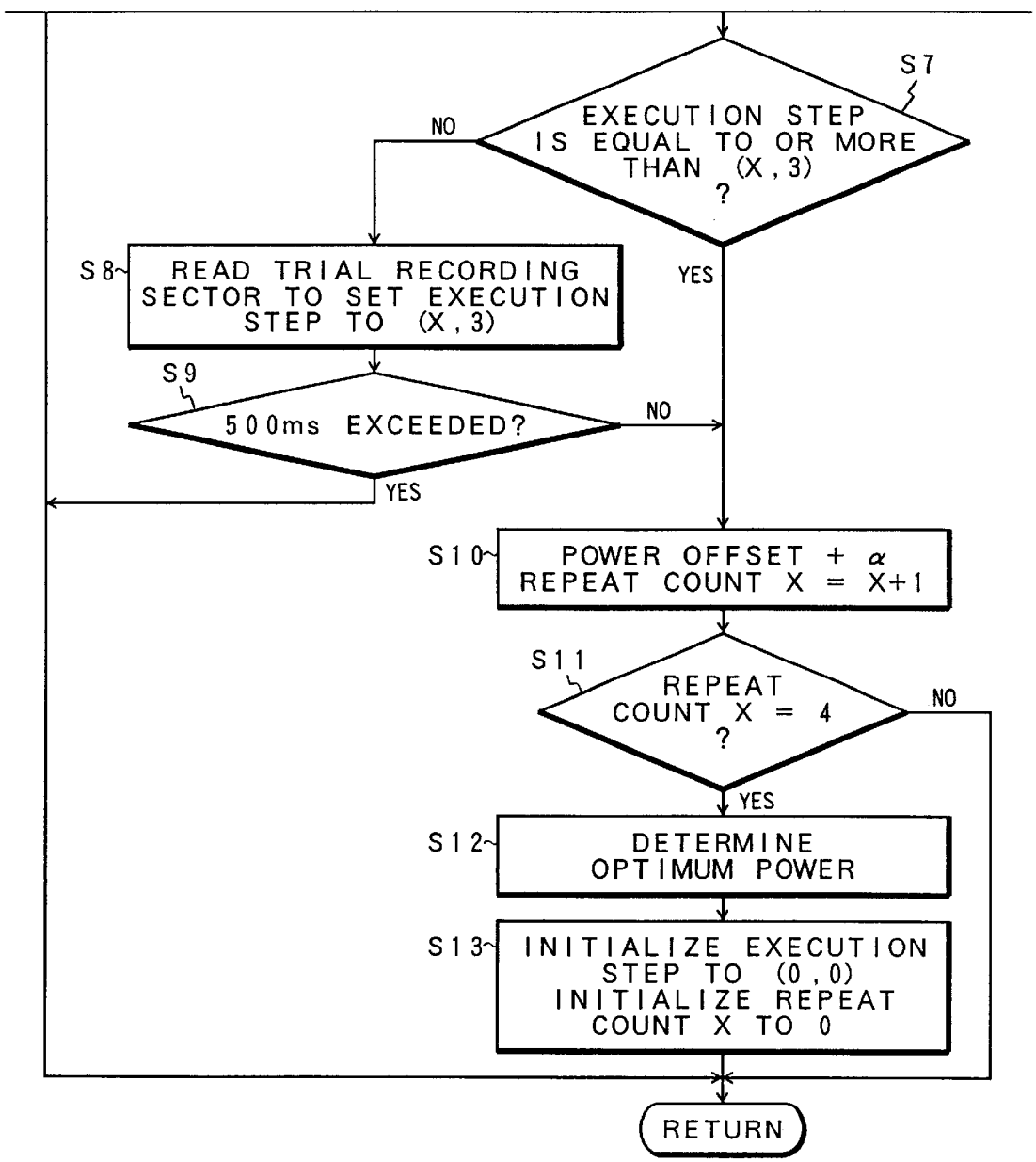

FIGS. 14A and 14B are flowcharts showing the details of the other processing of the separate execution of the adjacent area optimum condition setting processing in step S7 of FIG. 12. For the separate execution of the optimum condition setting processing in the adjacent area, the timer is actuated at the start of the separate execution to monitor the time. When a predetermined time, e.g., 500 ms is exceeded, the processing is interrupted to save the execution step at that time so that upon the next separate execution of the optimum condition setting processing in the adjacent area, the optimum condition setting processing is resumed from the saved step. First, in step S1 the elapsed time timer is actuated. Then in step S2 a check is made to see if it is not less than the execution step (0, 1). Here, in the initial state, the execution step is (0, 0) allowing the procedure to go to step S3 in which the test recording sector is erased for the setting of the execution step to (0, 1). A check is then made in step S4 to see if the elapsed time timer has exceeded 500 ms. If negative, it is checked in step S5 whether the execution step is not less than (0, 2). Since the execution step is currently (0, 1), the procedure goes to step S6 in which the test recording sector is written and the execution step is set to (0, 2). Afterward, a check is made in step S7 to see if the elapsed time timer has exceeded 500 ms. Unless the elapsed time timer exceeds 500 ms, it is checked in step S8 whether the execution step is not less than (0, 3). Since the current execution step is (0, 2), the procedure goes to step S9 in which the test recording sector is read with the error correction function halted to obtain the regenerative data error count from the comparison with the test data. Subsequently, the execution step is set to (0, 3) and a check is again made in step S10 to see if the elapsed time timer has exceeded 500 ms. If negative, then in step S11 the write power is offset by $+\alpha$ for the next optimum condition setting processing and the repeat count is incremented by one, after which a check is made in step S12 to see if the X=4 indicative of the number of times of repetition being 5 has been reached. If the repeat count X is less than 4, then the procedure goes back to step S2 in which the erase, write and read processing are repeated from the judgment of the execution step being X=1. When in the course of such erase, write and read the elapsed time timer exceeds 500 ms in any one of the steps S4, S7 and S10, the optimum condition setting processing is interrupted with the execution step at that time saved, allowing a return from FIG. 12 to the main routine of FIGS. 11A and 11B. Then when the number of times of reception of the write command reaches 100 in step S5 of FIG. 12, the procedure goes back to the adjacent area optimum condition setting processing of FIGS. 14A and 14B, allowing the optimum condition setting processing to be resumed from the execution step which has been saved upon the last interruption. If it is judged in step S12 that the repeat count X has reached X=4 indicative of the number of times of repetition being 5 as a result of repetition of the optimum condition setting processing based on such interruptions of the processing at every 500 ms, then the optimum write power is determined in step S13 as the intermediate value of the optimum write powers not more than the threshold, among the regenerative data error counts for the five write powers obtained by the five-times optimum condition setting processing. The optimum write power is divided by the default power to obtain a proportional coefficient which in turn is used as a power offset for the entry into the power table 166. Then in step S14 the execution step is initialized to (0, 0) with the initialization of the repeat count to X=0, after which the procedure goes to the main routine of FIGS. 11A and 11B for preparing the next separate execution of the adjacent area optimum condition setting processing.

Figure 15A:
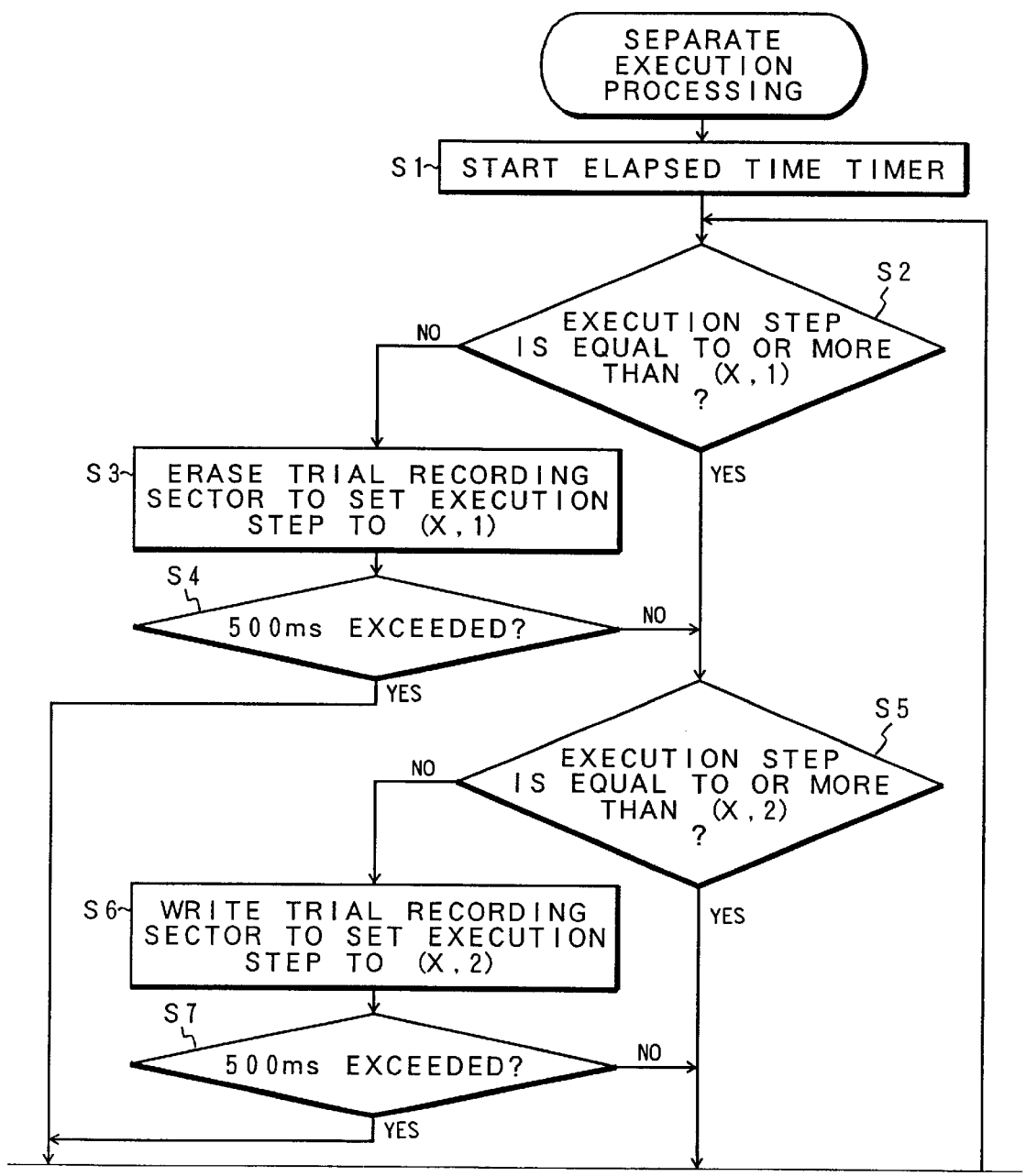
FIGS. 15A and 15B are flowcharts of the separate execution for setting the optimum laser power in the current area of FIGS. 11A and 11B.
Figure 15B:
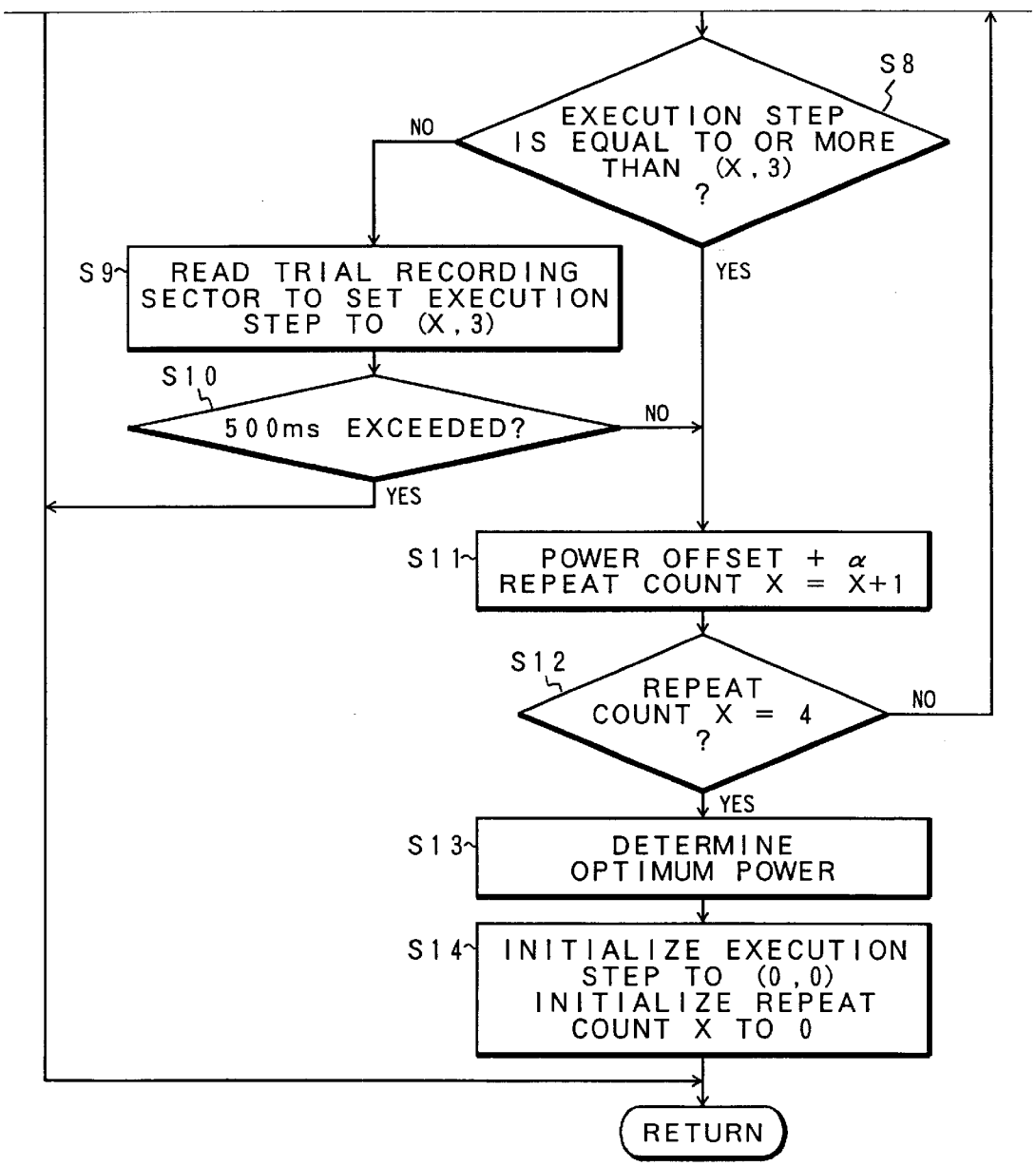

FIGS. 15A and 15B are flowcharts of the optimum condition setting processing for the current area effected by the separate execution control unit 180 provided in the setting control unit 162 of FIG. 6. FIGS. 15A and 15B show the details of the separate execution in step S5 of FIGS. 11A and 11B. For the separate execution of the optimum condition setting processing in the current area as well, the erase, write and read are repeated five times with the execution step managed by (X, 1), to thereafter determine the optimum write power. In cases where the separate execution of the optimum condition setting processing is once started, the timer is actuated at the start of the separate execution, and at the point of time when a predetermined time, e.g., 500 ms has elapsed, the processing is interrupted. The execution step at that time is saved so that upon the separate execution in synchronism with the next write command, the optimum condition setting processing is resumed from the thus saved step.

In FIGS. 15A and 15B, in synchronism with the write command from the host received in step S3 of FIGS. 11A and 11B, the separate execution of the current area optimum condition setting processing in step S5 is carried out. For this current area separate execution, the timer is first actuated in step S1. A check is then made in step S2 to see if the execution step is not less than (0, 1). Since the execution step is (0, 0) in the initial state, the procedure goes to step S3 for erasing the test recording sector and setting the execution step to (0, 1). It is then checked in step S4 whether the elapsed time timer has exceeded 500 ms. If negative, then a check is made in step S5 to see if the execution step is not less than (0, 2). Since the execution step is currently (0, 2), the procedure goes to step S6 for writing the test recording sector and setting the execution step to (0, 2). Afterward, it is checked in step S7 whether the elapsed time timer has exceeded 500 ms. If negative, a check is made in step S8 to see if the execution step is not less than (0, 3). Since the current execution step is (0, 2), the procedure goes to step S9 in which the test recording sector is read with the error correction function halted to obtain the regenerative data error count from the comparison with the test data, after which the execution step is set to (0, 3). A check is again made in step S10 to see if the elapsed time timer has exceeded 500 ms. If negative, then in step S1 the write power is offset by +α for the next optimum condition setting processing and the repeat count X is incremented by one, after which it is checked in step S12 whether X=4 indicative of the number of times of repetition being 5 has been reached. If the repeat count X is less than 4, then the procedure returns to step S2 to repeat the erase, write and read processing from the judgment of the execution step with X=1. When the elapsed time timer exceeds 500 ms in any one of the steps S4, S7 and S10 in the course of such the erase, write and read processing, the optimum condition setting processing is interrupted with the execution step at that time saved, allowing a return to the main routine of FIGS. 11A and 11B. Then, when the next write command is received in the main routine of FIGS. 11A and 11B, the procedure returns to the separate processing of the optimum condition setting of FIGS. 14A and 14B, allowing the optimum condition setting processing to be resumed from the execution step saved by the last interruption. If it is judged in step S12 that the repeat count has reached X=4 indicative of the number of times of repetition being 5 as a result of repetition of the optimum condition setting processing by the interruption of the processing at every 500 ms, then in step S13 the optimum write power is determined as the intermediate value of the optimum write powers less than the threshold, among the regenerative error counts for the five different write powers obtained by the five-times optimum condition setting processing. The thus determined optimum write power is divided by the default write power to obtain the proportional coefficient, which in turn is used as a power offset for the entry into the power table 166. Then in step S14, the execution step is initialized to (0, 0) with the initialization of the repeat count to X=0, after which the procedure returns to the main routine of FIGS. 11A and 11B for the preparation for the next separate execution of the current area optimum condition setting processing.

Figure 16:
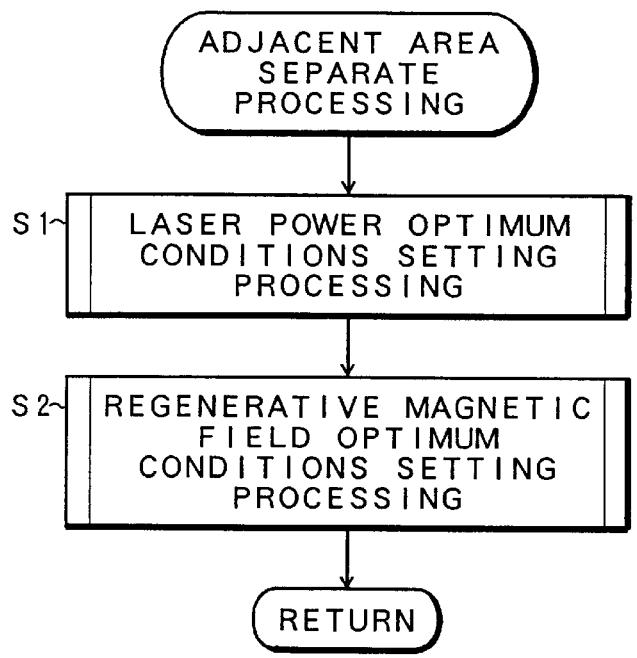
FIG. 16 is a flowchart of the adjacent area separate processing for setting the optimum condition of the laser power and of the regenerative magnetic field.

FIG. 16 is a flowchart of a further embodiment of the separate processing for setting the optimum condition in the adjacent area in step S7 of FIG. 12. This embodiment is characterized in that in case of use of a 1.3 GB MSR medium as the record medium, the optimum condition are set not merely for the laser power but also for the regenerative magnetic field. More specifically, in the adjacent area separate processing of FIG. 16, the laser power optimum condition setting processing is executed in accordance with the flowchart of FIGS. 13A and 13B or 14 in step S1, after which the optimum condition setting processing is carried out for the regenerative magnetic field in step S2.

Figure 17:
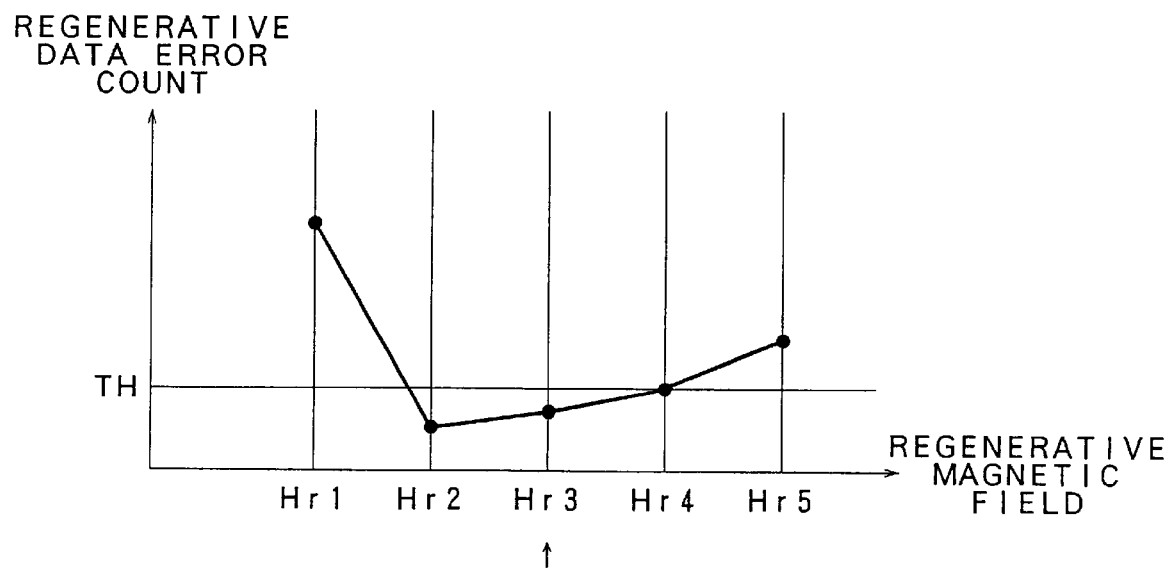
FIG. 17 is a characteristic diagram of the regenerative data error count relative to the variation of the regenerative magnetic field by the optimum condition setting processing of the present invention.

FIG. 17 shows the relationship between the regenerative magnetic field and the regenerative data error count, where after the optimum condition setting processing of test data, the regenerative magnetic filed is stepwise varied to Hr1, Hr2, Hr3, Hr4 and Hr5 with the constant regenerative laser power, regenerative data being obtained through the regeneration with the ECC based error correction function halted and being compared with the test data used in the optimum condition setting processing on a bit-by-bit basis to obtain the regenerative error count. Here, the regenerative magnetic field is varied within a range of 100 oersted, the minimum magnetic filed to 500 oersted, the maximum magnetic field, e.g., by 100 oersted width with the initial magnetic field of Hr=150 oersted. In this case, the regenerative data error count exceeds the threshold TH at the regeneration by the first regenerative magnetic filed Hr1, but falls to or below the threshold TH at the regeneration by the second, third and fourth regenerative magnetic fields, and increases over the threshold TH at the regeneration by the last regenerative magnetic field Hr5. Such a case, Hr3 which is the intermediate value of the three regenerative magnetic fields Hr2, Hr3 and Hr4 not more than the threshold TH is determined as an optimum regenerative magnetic field which is divided by a default regenerative magnetic field to obtain a proportional coefficient, which in turn is used as a regenerative magnetic field offset for the joint entry into the power table 166 of FIG. 6.

Figure 18A:
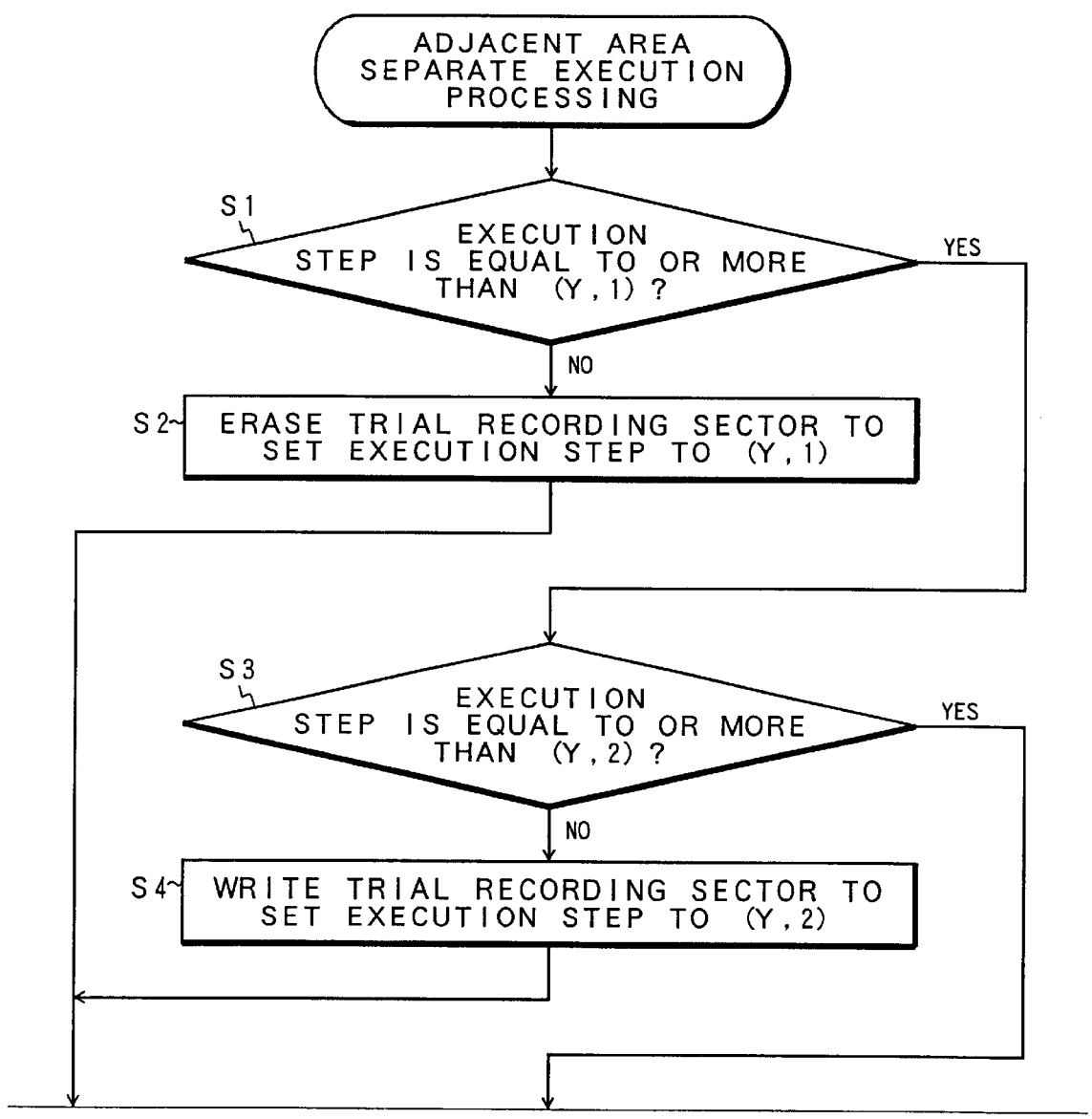
FIGS. 18A and 18B are flowcharts of a separate execution for setting the optimum condition of the regenerative magnetic field in the adjacent area of FIG. 16.
Figure 18B:
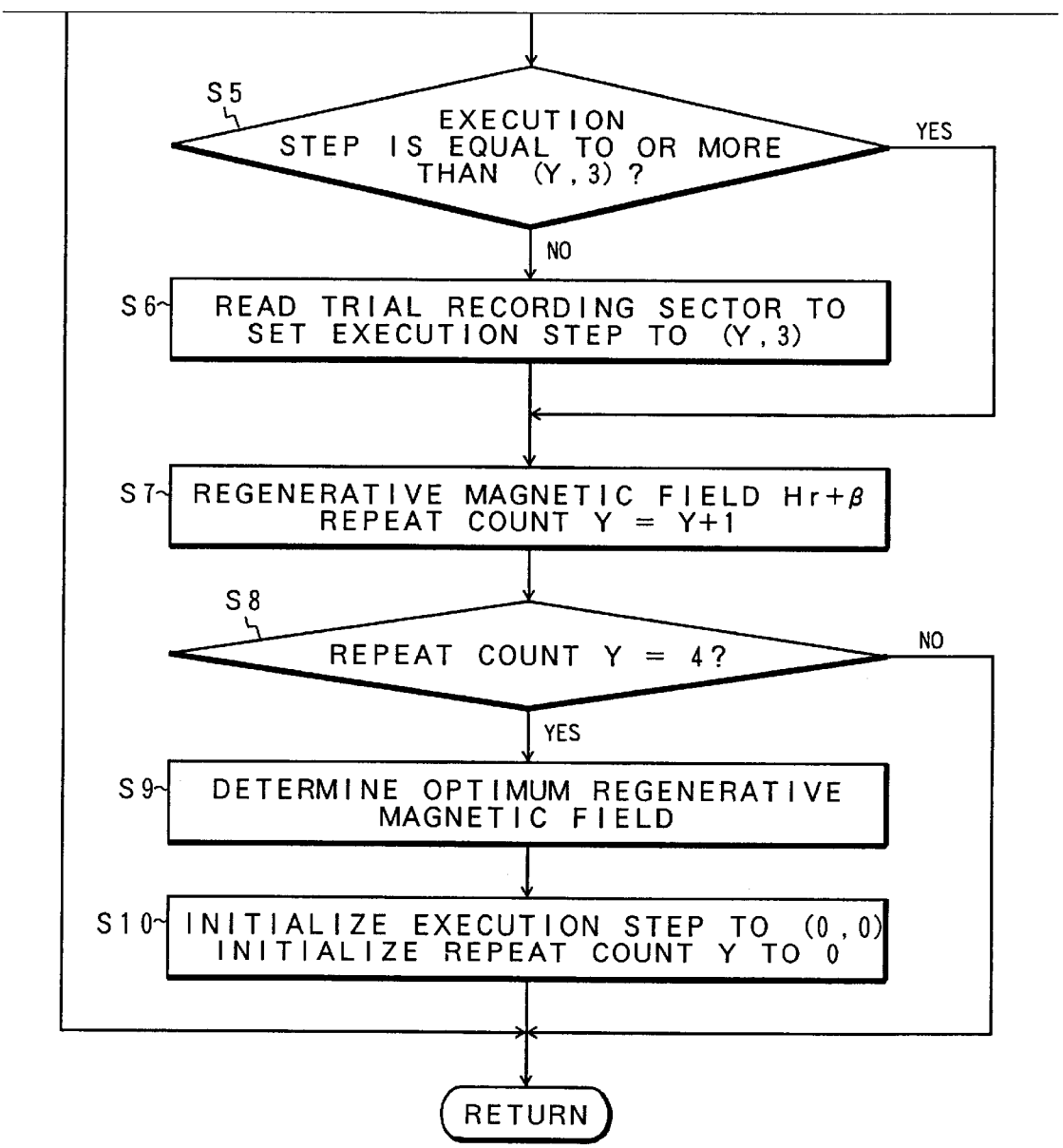

FIGS. 18A and 18B are flowcharts of the separate processing for setting the optimum condition of the regenerative magnetic field in the adjacent area in step S1 of FIG. 16. Here, the left-hand Y in the parentheses of the execution steps indicates the number of times of execution. In this embodiment, the erase, write and read are carried out five times so that Y is varied from 0 to 1, 2, 3 and 4. The right-hand values 1, 2 and 3 in the parentheses of the execution steps indicate the erase, write and read, respectively. First in step S1 a check is made to see if the execution step is not less than (Y, 1). In the first separate execution, the execution step is (0, 0) and hence the procedure goes to step S2 in which a test recording sector of the foremost zone of the adjacent area is erased by the optimized erase power with the execution step being set to (0, 1) for there turn to FIG. 12. In the next adjacent area separate execution, the execution step is (0, 1) and hence the procedure advances from step S1 to step S3. Since the execution step is less than (0, 2), in step S4 the test recording sector of the foremost zone of the adjacent area is written by the write power which has been optimized by the test data, allowing the execution step to be set to (0, 2) for the return to FIG. 12. In the third adjacent area separate execution, the execution step is (0, 2) and hence the procedure advances from the steps S1 and S3 to step S5. Since the execution step is less than (0, 3), with the use of the regenerative laser power optimized in step S6 the regenerative magnetic field is set to a predetermined initial value, e.g., Hr=150 oersted and the read is further performed with the error correction function halted to set the execution step to (0, 3) for the advancement to step S7. In step S7, the regenerative magnetic field Hr is increased by the offset magnetic field +β for the next regeneration and the repeat count Y is incremented by one to Y=1. Then in step S8 it is checked whether the repeat count has reached Y=4 indicative of the number of times of repetition being 5. Since it is the first time, the procedure returns to FIG. 12. Similar processing is repeated for the second time with the repeat count Y=1, the third time with the repeat count Y=2 and the fourth time with the repeat count Y=3. For the fifth time with the repeat count 4, the separate processing of the erase, write and read is executed after which the repeat count Y=4 indicative of the number of times of repeat being 5 is judged in step S8. Then in step S9, an optimum regenerative magnetic field is determined as the intermediate value of the regenerative magnetic fields of error counts not more than the threshold value, among the regenerative data error counts for the five regenerative magnetic fields obtained at that time. The optimum regenerative magnetic field is divided by the default regenerative magnetic field to obtain a regenerative magnetic field offset as the proportional coefficient for the entry into the power table. After the completion of determination of the optimum write power of step S9, in step S10 the execution step is initialized to (0, 0) with the initialization of the repeat count to Y=0, preparing the next adjacent area separate processing. Although the erase, write and read are repeated five times in FIGS. 18A and 18B, the erase and write may be performed only the first time with the skip thereof for the second or later times.

Figure 19A:
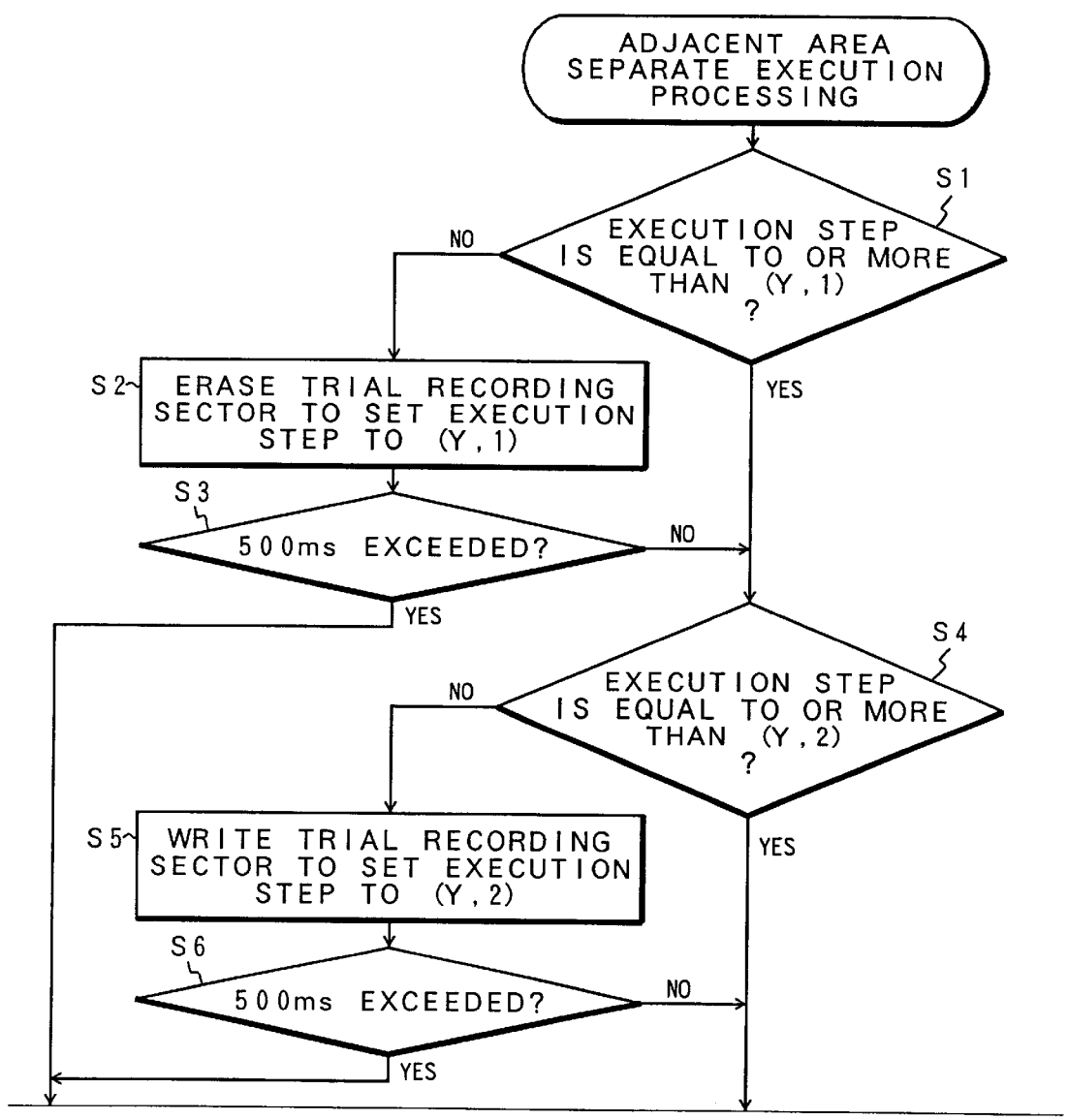
FIGS. 19A and 19B are flowcharts of another separate execution for setting the optimum condition of the regenerative magnetic field in the adjacent area of FIG. 16.
Figure 19B:
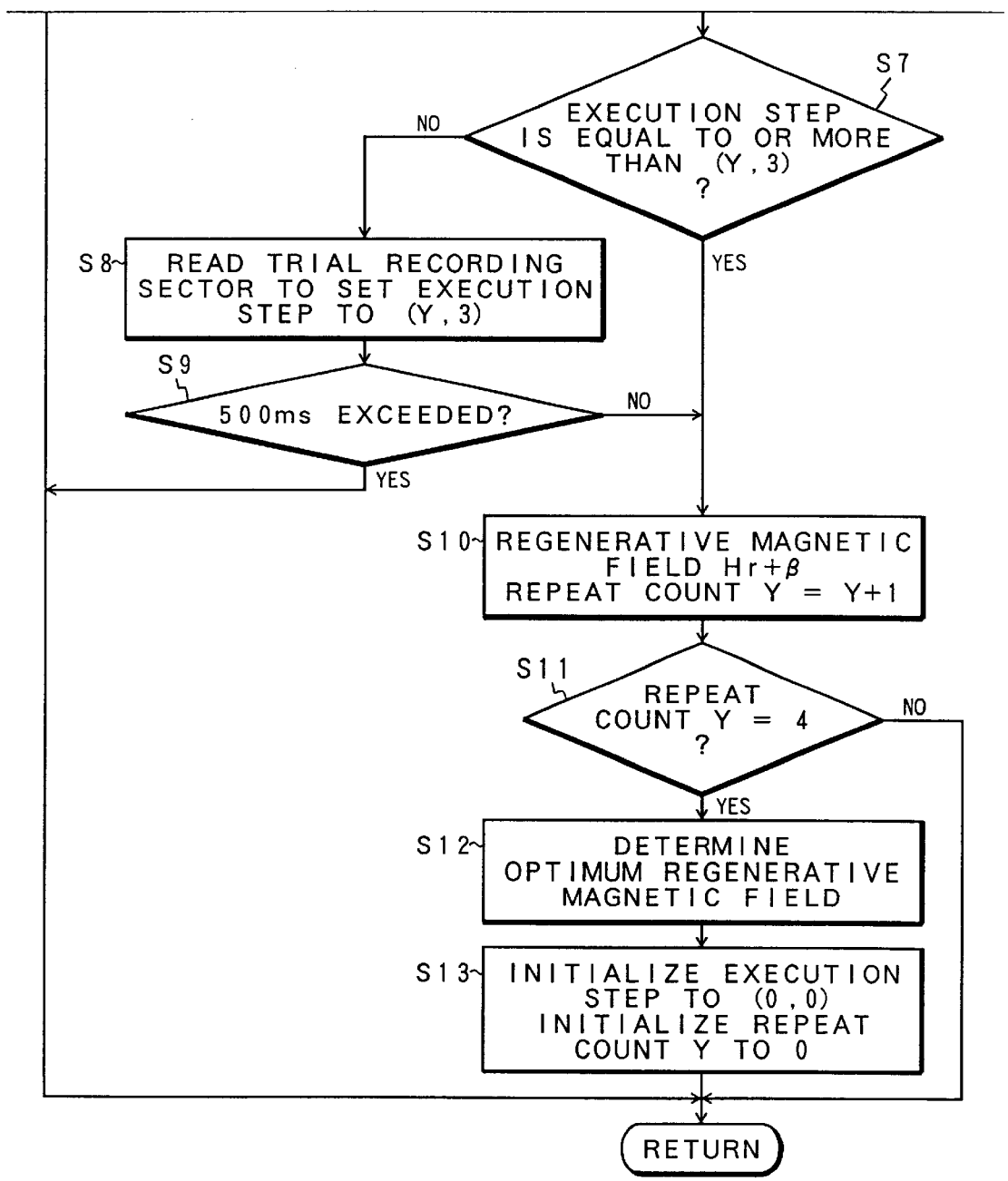

FIGS. 19A and 19B are flowcharts of a yet further embodiment of the separate processing for setting the optimum condition of the regenerative magnetic fields in the adjacent area in step S2 of FIG. 16. This separate processing is characterized in that the timer is actuated at the start of the separate processing to monitor the time so that the processing is interrupted at the point of time when a predetermined time, e.g., 500 ms has elapsed, to save the execution step at that time so as to allow the processing to be resumed from the thus saved step upon the next separate execution. First, in step S1 the elapsed time timer is actuated. Then in step S2 it is checked whether the execution step is not less than (0, 1). Here, in the initial state the execution step is (0, 0) and hence the procedure goes to step S3 for erasing the test recording sector and setting the execution step to (0, 1). It is then checked in step S4 whether the elapsed time timer has exceeded 500 ms or not. If negative, then a check is made in step S5 to see if the execution step is not less than (0, 2). Since the current execution step is (0, 1), the procedure goes to step S6 in which test data are written on the test recording sector by use of the optimum laser power and the execution step is set to (0, 2), after which it is checked in step S7 whether the elapsed time timer has exceeded 500 ms. If negative, then a check is made in step S8 to see if the execution step is not less than (0, 3). Since the current execution step is (0, 2), the procedure goes to step S9 in which the optimum laser power is set with the setting of the regenerative magnetic field to its initial value so that the test recording sector is read with the error correction function halted. Then, after the acquisition of the regenerative data error count from the comparison with the test data, the execution step is set to (0, 3) and it is again checked in step S10 whether the elapsed time timer has exceeded 500 ms. If negative, then in step S11 the regenerative magnetic field is offset by +β for the next regeneration and the repeat count Y is incremented by one, after which it is checked in step S12 whether Y=4 indicative of the number of times of repetition being 5 has been reached. If the repeat count Y is less than 4, then the procedure goes again to step S2 for repeating the read from the judgment of the execution step with Y=1. When the elapsed time timer exceeds 500 ms in any one of the steps S4, S7 and S10 in the course of such the erase, write and read, the optimum condition setting processing is interrupted with the execution step at that time saved, allowing a return from FIG. 12 to the main routine of FIGS. 11A and 11B. Then when the number of times of reception of the write command reaches 100 in step S5 of FIG. 12, the procedure returns to the optimum condition setting processing of the adjacent area of FIGS. 14A and 14B, allowing the optimum condition setting processing to be resumed from the execution step saved by the last interruption. When it is judged in step S12 that the repeat count Y has reached Y=4 indicative of the number of times of repetition being 5 as a result of repetition of the optimum condition setting processing by the interruption of the processing at every 500 ms in this manner, an optimum regenerative magnetic field is determined in step S13 as the intermediate value of the regenerative magnetic fields not more than the threshold, among the regenerative data error counts for five regenerative magnetic fields obtained by the five-times read. The thus determined optimum regenerative magnetic field is divided by the default regenerative magnetic field to obtain a proportional coefficient which in turn is used as the regenerative magnetic field offset for the entry into the power table 166. Then in step S14, the execution step is initialized to (0, 0) with the initialization of the repeat count to Y=0, after which the procedure goes to the main routine of FIGS. 11A and 11B for preparation for the next separate execution of the adjacent area optimum condition setting processing. It is to be noted that in FIG. 19 as well, the erase and write may be performed only once and that the second or later steps may be skipped. In the magnetic field optimum condition setting processing, the optimum condition may be set in a similar manner not only for the regenerative magnetic field but also for the magnetic fields used in the write or erase. Furthermore, in the event that the optimum regenerative magnetic field is not yet determined even though the regenerative magnetic field has reached, e.g., its upper limit in the processing of FIGS. 18A and 18B or 19, the processing may be iterated in which the regenerative magnetic field optimum value is determined while varying the regenerative laser power.

As set forth hereinabove, the present invention is effective for the storage apparatus needing a precision setting in the super-high density recording since it can improve the data throughput while keeping the recording or regeneration performances. For example, when approaching the adjacent area needing the determination of the optimum write power by the optimum condition setting processing during the sequential processing by the host command, the next area optimum condition setting processing may separately be executed in synchronism with the host command for current area sequential processing so that before entering the next area its optimum write power is previously determined to thereby eliminate the need for the time-consuming optimum write power determination processing by the optimum condition setting processing upon the switching of the area, whereupon it is possible to securely prevent any interruption of the sequential processing from the host due to the operation wait attributable to the optimum condition setting processing.

Although the above embodiments are directed to the 540 MB format optical disk medium having 18 zones as the optimum condition effective area by way of example, they could be applied similarly to a 10-zoned 230 MB format optical disk medium, an 11-zoned 640 MB format optical disk medium and an 18-zoned 1.3 GB format optical disk medium. For example, the apparatus side may divide the area into thee areas for management, i.e., the inner peripheral area, the intermediate area and the outer peripheral area so that when the processing by the sequential recording approaches an adjacent area from a certain, the separate execution is made of the optimum condition setting processing of the adjacent area and that the optimum condition setting processing is terminated upon the area switching to thereby prevent any wait time from taking place.

Although the above embodiments have separately executed the erase, recording and regeneration for the separate execution of the adjacent area optimum condition setting processing, the optimum condition setting processing to be performed by a single separation may naturally be any combination of the erase, recording and regeneration.

Although the above embodiments have been directed to the optical disk medium needing the erase, the overwrite optical disk medium may be subjected to a separate processing of the optimum condition setting processing without the erase processing.

The present invention covers any modifications without impairing its objects and advantages and is not limited by numerical values indicated in the embodiments.

Although the above embodiments have been directed to the batch execution or the separate execution of the optimum condition setting processing in synchronism with a write command from the host by way of example, the same will apply to the case where a read command is received from the host regenerating the sequential data. In such a case, when approaching the adjacent area needing the optimum condition setting processing, the separate execution of the optimum condition setting processing of the adjacent area may previously be performed in synchronism with the reception of the read command.

Although the above embodiments have achieved the shortened processing by executing the optimum condition setting processing through the segmentations of the plurality of zones into several areas, the processing maybe executed on a zone-by-zone basis in a finer manner. Alternatively, the area may be coincident with the zone.

Any apparatuses adapted for the sequential could execute the optimum condition setting processing by using the access to a specific address as the trigger. In such a case, the optimum condition setting processing could be performed without any judgment of whether the data are continuous ones or not.

In cases where the user side uses both the sequential and random, judgment may be made of whether it is sequential or not as in the above embodiments.

Alternative arrangement may be such that the optimum condition setting processing is carried out in response to the access to the area boundary irrespective of the random or sequential.

The present invention is further applicable to not only the power adjustment of the light modulation type magneto-optical storage medium but also to the power adjustment of the phase change type optical storage medium, DVD, CD-R, CD-RW or other optical storage media. The present invention is further applicable to the adjustment of the magnetic field strength of the magnetic head of the magnetic storage apparatus.

What is claimed is:

1. A storage apparatus comprising:
an optimum condition setting processing unit for determining optimum conditions used in recording or reproduction in each of a plurality of condition effective areas of a medium; and
a setting control unit which, when judging a possibility of a migration to an adjacent area, provides a control of said optimum condition setting processing unit so that the optimum conditions for use in the adjacent area are determined in advance.

2. A storage apparatus according to claim 1, wherein said optimum condition setting process includes setting an optimum power of a light beam emission power for any one of recording, reproduction and erase or includes setting an optimum magnetic field.

3. A storage apparatus according to claim 1, wherein said setting control unit allows a separate execution of said optimum condition setting process of the next optimum condition effective area.

4. A storage apparatus according to claim 1, wherein said setting control unit allows a separate execution of said optimum condition setting process of the next optimum condition effective area in synchronism with the reception of a command a predetermined number of times from a host.

5. A storage apparatus according to claim 1, wherein said setting control unit makes a judgment to process sequential data when recording or regenerating target blocks are substantially continuous along a track of said medium.

6. A storage apparatus according to claim 5, wherein said setting control unit makes a judgment to process sequential data when relative to a last track for the most recent recording or reproduction, a leading track for the current recording or reproduction lies within a prescribed number of tracks and when this continues over a prescribed number of times.

7. A storage apparatus according to claim 1, wherein said optimum condition effective area is composed of a single zone or a plurality of zones.

8. A storage apparatus according to claim 7, wherein said zone is a zone or band that is recorded or regenerated with a constant angular velocity.

9. A storage apparatus according to claim 1, wherein said optimum condition effective area is composed of a single zone or a plurality of zones, and wherein said control unit makes a judgment of a migration of recording or reproduction of sequential data to the next optimum condition effective area from sequential process in which recording or reproduction is performed in sequence.

10. A storage apparatus comprising:
an optimum condition setting processing unit which, for each of a plurality of optimum condition effective areas of a medium segmented in a predetermined direction of said medium, performs optimum condition setting process on said medium to determine optimum conditions used in recording or reproduction in each area; and
a setting control unit which, when during the recording or reproduction of data in an optimum condition effective area, a migration is judged of data recording or reproduction to an adjacent next optimum condition effective area, provides a control of said optimum condition setting process unit to allow execution of the optimum condition setting processing of the next optimum condition effective area so that the optimum conditions are determined in advance.

11. A storage apparatus according to claim 10, wherein said optimum condition setting process includes setting an optimum power of a light beam emission power for any one of recording, reproduction and erase or includes setting an optimum magnetic field.

12. A storage apparatus according to claim 10, wherein said setting control unit allows a separate execution of said optimum condition setting process of the next optimum condition effective area.

13. A storage apparatus according to claim 10, wherein said setting control unit allows a separate execution of said optimum condition setting process of the next optimum condition effective area in synchronism with the reception of a command a predetermined number of times from a host.

14. A storage apparatus according to claim 10, wherein said setting control unit makes a judgment to process sequential data when recording or reproduction target blocks are substantially continuous along a track of said medium.

15. A storage apparatus according to claim 14, wherein
said setting control unit makes a judgment to process sequential data when relative to a last track for the most recent recording or reproduction, a leading track for the current recording or reproduction lies within a prescribed number of tracks and when this continues over a prescribed number of times.

16. A storage apparatus according to claim 10, wherein
said optimum condition effective area is composed of a single zone or a plurality of zones.

17. A storage apparatus according to claim 16, wherein
said zone is a zone or band that is recorded or regenerated with a constant angular velocity.

18. A storage apparatus according to claim 10, wherein
said optimum condition effective area is composed of a single zone or a plurality of zones, and wherein
said control unit makes a judgment of a migration of recording or reproduction of sequential data to the next optimum condition effective area from sequential process in which recording or reproduction is performed in sequence.

19. A storage apparatus according to claim 10, wherein
said optimum condition effective area is composed of a single zone or a plurality of zones, and wherein
said control unit makes a judgment of a migration of recording or reproduction of sequential data to the next optimum condition effective area when sequentially recording or reproduction sequential process migrates to the latter half of a zone adjacent to the next optimum condition effective area.

20. A storage apparatus according to claim 10, wherein
said optimum condition effective area is composed of a single zone or a plurality of zones, and wherein
said control unit makes a judgment of a migration of recording or reproduction of sequential data to the next optimum condition effective area when sequentially recording or reproduction sequential process migrates to the latter half of a zone adjacent to the next optimum condition effective area.

* * * * *